US008363098B2

(12) United States Patent
Rosener et al.

(10) Patent No.: US 8,363,098 B2
(45) Date of Patent: Jan. 29, 2013

(54) INFRARED DERIVED USER PRESENCE AND ASSOCIATED REMOTE CONTROL

(75) Inventors: Douglas Kenneth Rosener, Santa Cruz, CA (US); William Owen Brown, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1134 days.

(21) Appl. No.: 12/211,701

(22) Filed: Sep. 16, 2008

(65) Prior Publication Data
US 2010/0066821 A1 Mar. 18, 2010

(51) Int. Cl.
H04N 7/18 (2006.01)
H04N 5/33 (2006.01)
(52) U.S. Cl. .......................................... 348/77; 348/164
(58) Field of Classification Search ............... 348/77–80, 348/150–156, 164
See application file for complete search history.

(56) References Cited

U.S. PATENT DOCUMENTS

| | | | |
|---|---|---|---|
| 2002/0030871 A1* | 3/2002 | Anderson et al. | 359/150 |
| 2002/0076060 A1* | 6/2002 | Hall et al. | 381/74 |
| 2006/0023915 A1* | 2/2006 | Aalbu et al. | 382/103 |
| 2006/0192775 A1 | 8/2006 | Nicholson et al. | |
| 2006/0197840 A1* | 9/2006 | Neal et al. | 348/169 |
| 2007/0247449 A1* | 10/2007 | Mack et al. | 345/204 |
| 2008/0198129 A1* | 8/2008 | Cheng et al. | 345/156 |
| 2008/0221877 A1* | 9/2008 | Sumita | 704/211 |

FOREIGN PATENT DOCUMENTS

| | | |
|---|---|---|
| EP | 0984347 A2 | 3/2000 |
| WO | 9525300 A1 | 9/1995 |
| WO | 0052563 A1 | 9/2000 |

OTHER PUBLICATIONS

International Search Authority, European Patent Office. PCT/US2009/050758. International Search Report. Mail Date: Jan. 22, 2010. Rijswijk, Netherlands.
International Search Authority, European Patent Office. PCT/US2009/050758. Written Opinion. Mail Date: Jan. 22, 2010. Rijswijk, Netherlands.
Aoki, Hisashi; Matushita, Soichiro. Balloon Tag: (In)Visibile Marker Which Tells Who's Who. Proceedings of the 4th IEEE International Symposium on Wearable Computers. 2000. IEEE Computer Society. Washington, DC.
T. Starner, J. Auxier, D. Ashbrook, M. Gandy. The Gesture Pendant: A Self-Illuminating, Wearable, Infrared Computer Vision System for Home Automation Control and Medical Monitoring. . The Fourth International Symposium on Wearable Computers. Oct. 2000. pp. 87-94. Atlanta, GA.
A. Aminzadeh-Gohari, M.R. Pakravan. Analysis of Power Control for Indoor Wireless Infrared CDMA Communication. Performance, Computing, and Communications Conference, 2006. IPCCC 2006. 25th IEEE International. Apr. 10-12, 2006. pp. 6 pp.-302. Phoenix, AZ.

(Continued)

Primary Examiner — Joshua Joo
(74) Attorney, Agent, or Firm — Chuang Intellectual Property Law

(57) ABSTRACT

Methods and apparatuses for reporting user presence associated with orientation and proximity of a user to a display device are disclosed. In one example, image data associated with a head mounted device and one or more infrared light sources is captured and processed to identify the presence of infrared light source objects. A detection status is output based on the presence of infrared light source objects, and the detection status is translated to an associated user presence state.

28 Claims, 19 Drawing Sheets

OTHER PUBLICATIONS

S. Matsushita. A Headset-Based Minimized Wearable Computer. Intelligent Systems, IEEE vol. 16, Issue 3, May-Jun. 2001 pp. 28-32.
International Search Authority, European Patent Office. PCT/US2009/050758. Preliminary International Search Report. Mail Date: Oct. 23, 2009. Rijswijk, Netherlands.
J. Chung, N. Kim, G. Kim, & C. Park. Posttrack: A Low Cost Real-Time Motion Tracking System for VR Application. Virtual Systems and Multimedia, 2001. Proceedings. 7th Annual AL Conference Oct. 2001. IEEE. p. 383-392. ISBN: 9780769514024. USA.
International Search Authority, European Patent Office. PCT/US2009/050758. Invitation to Pay Additional Fees. Mail Date: Oct. 23, 2009. Rijswijk, Netherlands.

* cited by examiner

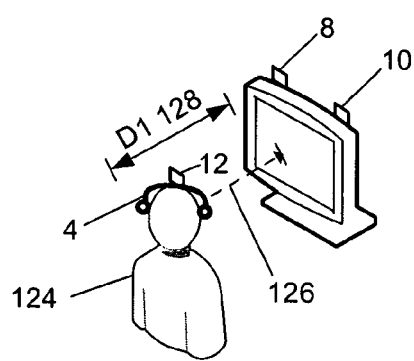 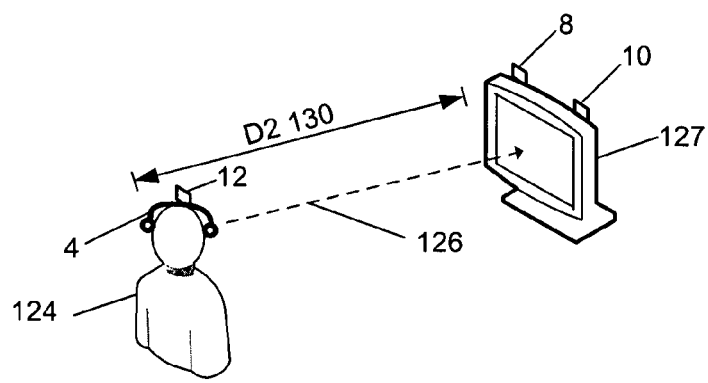
FIG. 7A     FIG. 7B
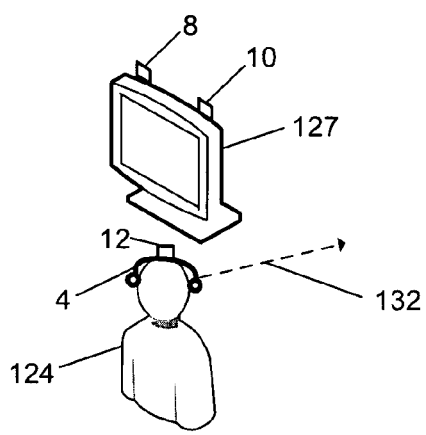 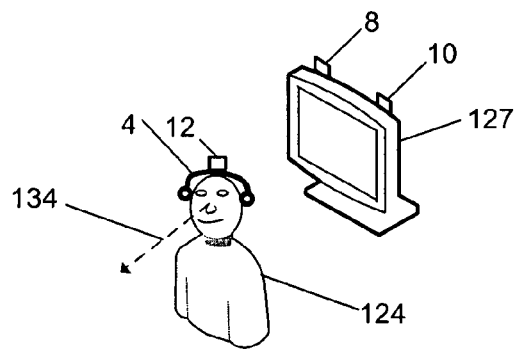
FIG. 8      FIG. 9

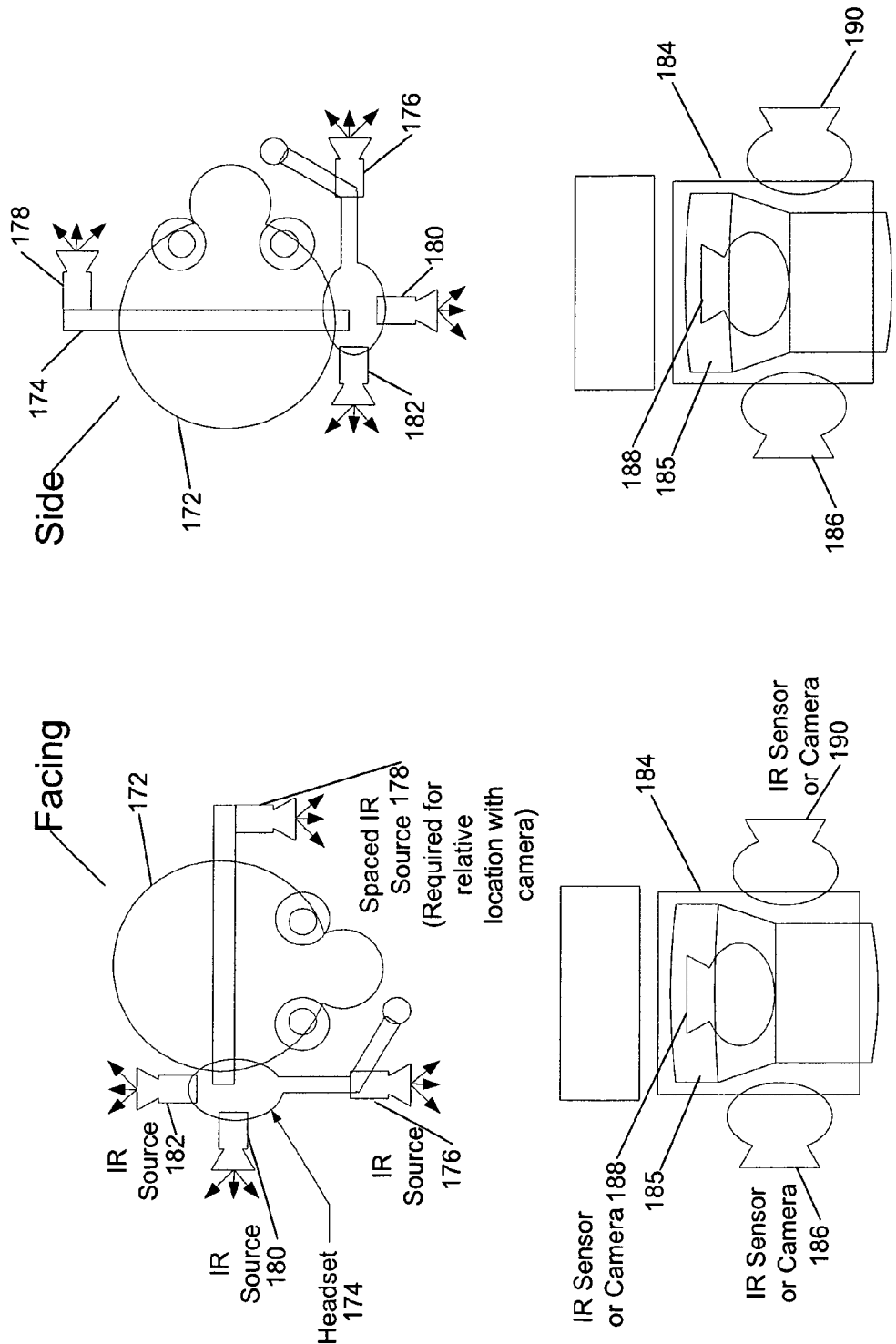

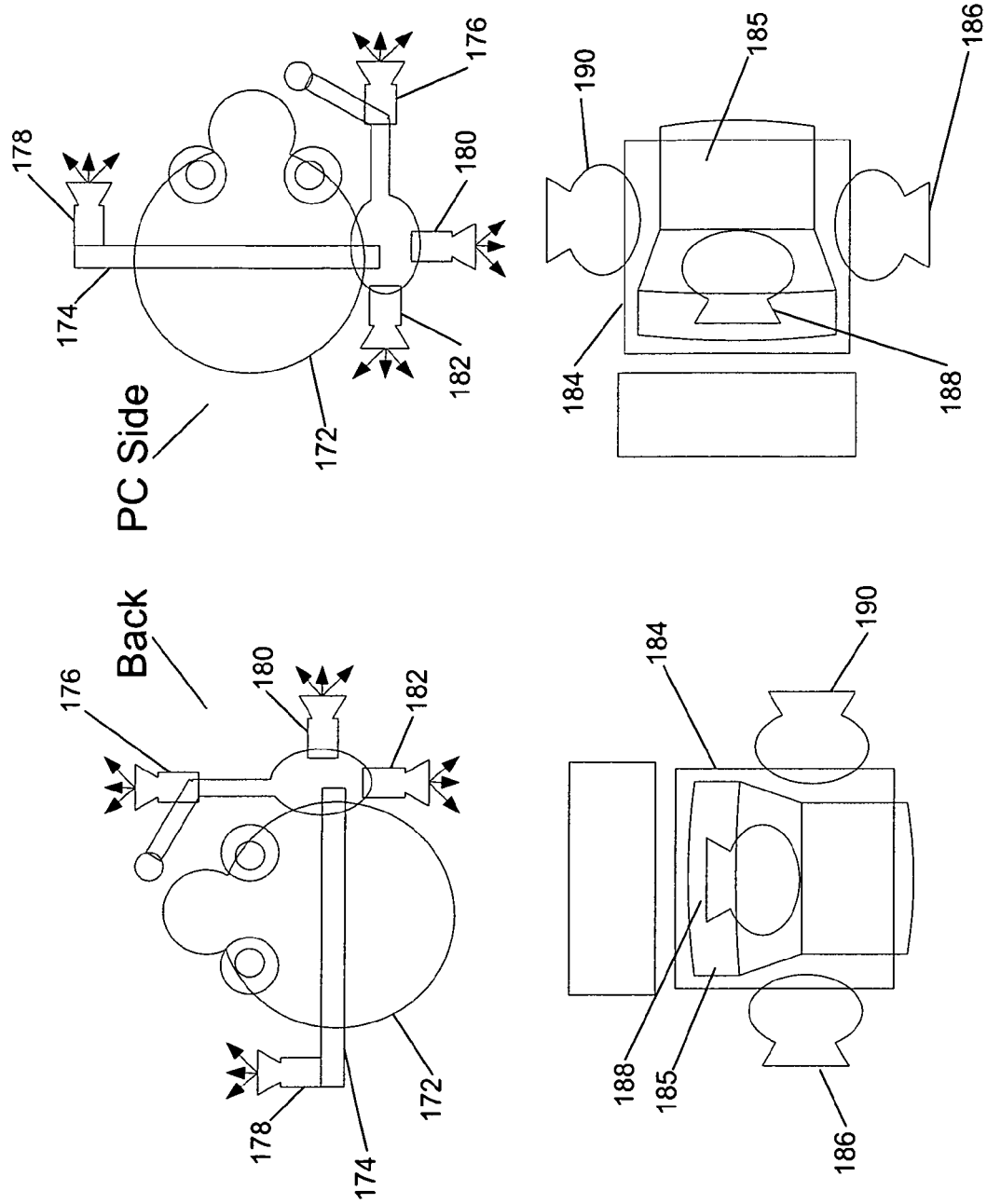

INFRARED DERIVED USER PRESENCE AND ASSOCIATED REMOTE CONTROL

BACKGROUND OF THE INVENTION

The convergence of computers, voice communications, and the Internet has revolutionized the manner and speed by which people are able to communicate. People today have the capacity to communicate instantly using a variety of communication devices and methods. However, as the number of methods by which a person can communicate has increased, so has the possibility that a person may be communicating using one method when someone attempts to contact him or her with an alternate method. In such a situation, the person may be unavailable to receive communications. Generally, the terms "presence" or "presence awareness" refer to the concept of providing others with information about a user's ability or willingness to communicate.

In the prior art, the concept of using presence in communication systems is often applied in instant messaging (IM) systems. IM is an increasingly popular form of electronic communication that allows users of networked computers to communicate in real-time. In a typical IM system, an IM application is installed on the computer of each user. Users of the same IM service are distinguished from one another by user identifications (IDs). Contact lists (i.e., "buddy lists") are also provided to allow users to save the user IDs of the people they most frequently communicate with.

An IM user initiates an IM session by selecting a user ID from his or her contact list and typing a message to the selected contact through a keyboard attached to the IM initiator's computer. The IM application transmits the IM to the IM application executing on the contacted user's (i.e., buddy's) computer. The IM application then displays the IM on the display device (also referred to as a "visual display", "display", or "monitor") of the contacted user's computer. The contacted user may then either ignore the IM or respond to the IM by typing a message back to the IM initiator.

Most IM applications also provide information indicating whether a "buddy" in the user's contact list is available or unavailable to engage in an IM session. This presence information is provided to IM users in the form of presence status indicators or icons, which are typically shown next to the buddy's user ID in a user's contact list. Typical presence status indicators include: online, offline, busy (e.g., on the phone) or away from the computer (e.g., in a meeting). These presence status indicators are useful since, unlike traditional e-mail systems, an IM user need only check the presence status of the user to determine whether the other user is available for real-time messaging.

Many IM applications require an IM user to manually select from among a plurality of available presence status indicators in order to inform other IM users of their presence status. Other IM applications, such as the Microsoft UC client application, provide a limited capability of determining the presence status of a user automatically by tracking whether the user has interacted with his or her computer's keyboard or mouse during a predetermined time span (e.g., 15 minutes). This process allows the online/offline and present/away status to be determined without the user having to manually set his or her presence status preference. However, because the user may be present at the computer for an extended period of time without actually interacting with the computer's keyboard or mouse, monitoring and updating the presence status of the user using this approach is not very reliable.

Another shortcoming of prior art presence aware IM systems, and other presence aware real-time communication systems (e.g., voice over Internet protocol (VoIP), is that they do not generally determine the proximity of a user relative to the user's computer, other than for times when perhaps the user is interacting with the computer's keyboard or mouse. Systems that do attempt to determine proximity often rely on received signal strength indication (RSSI) between a radio and its base. However, the use of RSSI to determine proximity can be unreliable for a variety of reasons. For example, since RSSI does not require visual line of sight, it is unreliable for use in determining whether a user is capable of viewing a display screen. Though close in distance to the display screen, the user may be behind the display screen or on the other side of a wall from the display screen. Finally, prior art presence aware IM systems, and other real-time communication systems, do not provide a reliable means for determining that a user is viewing his or her display.

It would be desirable to have real-time communication methods and apparatuses for determining whether a user is viewing his or her computer monitor display, or in an appropriate position to easily view his or her display if desired. Furthermore, it would be desirable to have accurate proximity information in conjunction with the user's capacity to view his or her display. For example, it would be desirable to know how far the user is from his or her display so that the size of an IM or other text or video appearing on the display can be scaled appropriately. Furthermore, it would be desirable to identify and distinguish between different users, whereby the quantity of scaling and criterion for when scaling occurs is specific to each user.

Another area that is interested in user presence is security. Users forget to lock their screens, and may want them to auto lock when far away and unlock when close. Again RSSI as a proximity measure would be okay for locking but not okay for unlocking if the user is on the other side of a wall. Security sometimes depends on face recognition. A security application could perform pattern recognition on camera input whenever the user is facing the camera without having to tell the user to explicitly look into the camera if there was a means to sense when the user is facing it.

As a result, there is a need for improved methods and apparatuses for gathering, utilizing, and delivering presence information.

BRIEF DESCRIPTION OF THE DRAWINGS

The present invention will be readily understood by the following detailed description in conjunction with the accompanying drawings, wherein like reference numerals designate like structural elements.

FIGS. 7A and 7B are diagrams illustrating example user presence states which are detected.

FIG. 8 is a diagram illustrating an example user presence state which is detected.

FIG. 9 is a diagram illustrating an example user presence state which is detected.

FIGS. 15A to 15D are diagrams illustrating example user presence states related to the user orientation and position with respect to a visual display.

DESCRIPTION OF SPECIFIC EMBODIMENTS

Figure 1:
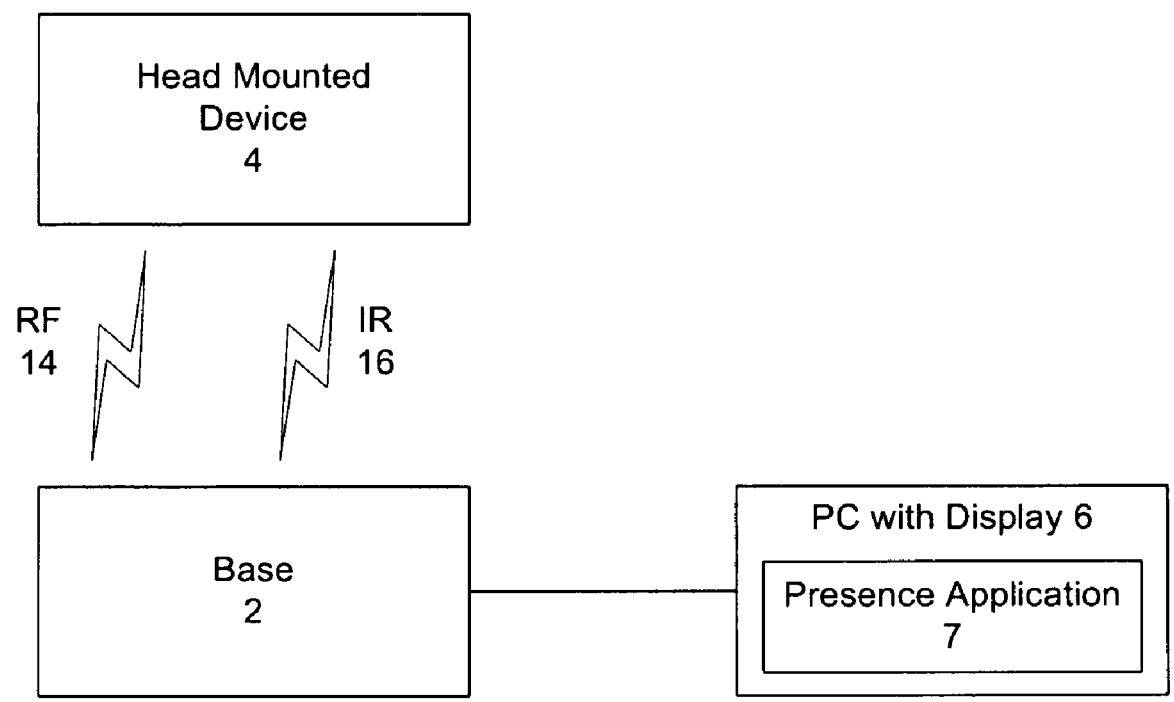
FIG. 1 illustrates a simplified block diagram of an example of an IR sensor system and method for user presence detection and display control.

Methods and apparatuses for reporting user presence associated with orientation and proximity of a user to a display device are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to reporting of presence information associated with orientation of a user with respect to viewing a display device and proximity of the user to the display device derived from an infrared (IR) system. In one example, a head or body mounted device (HMD) includes one or more IR light sources. An IR camera is anchored at the display device and is able to report the IR light source locations on a 2-D grid. Alternatively, the IR camera is located on the head mounted device and the IR light sources located at the display device. The camera output data is passed to an application, e.g., a real-time communication client running on a processor, e.g. in a personal computer (PC), to be processed further to provide further functioning as described herein. Alternatively, this processor may be in a base unit that is connected to the PC.

In another example, the HMD may have both cameras and IR sources. The same can be true for the PC or base unit.

In another example, the cameras can be replaced with simple photodetectors.

In one example, the HMD has been previously paired with a base or PC using a wireless connection such as Bluetooth or a wired connection such as USB. In that process, unique data can be exchanged, for example, the physical address (a unique identifier) of the HMD is made known to the base or PC application. If IR light sources are on the HMD, the IR light can be modulated so that an IR detector system can receive and demodulate this signal, resulting in a data string that indicates the physical address of the HMD. Alternatively, random data can also be sent via the wireless link to be transmitted on the IR link. The IR transmitted data may be encrypted, to prevent an eavesdropping on the link. In this manner, the base or PC application can detect whether the detected IR light sources are properly associated with the IR detectors. This example can work with IR detectors on the HMD and IR sources at the base as well. In this case, the unique address is transmitted on the wireless link previously (say at pairing) and the HMD recognizes its address from its IR detectors.

For embodiments utilizing cameras, presence information is derived from the number of IR light sources detected by the camera, and proximity information may be derived based on the spacing of the detected IR light sources in the image capture. For example, reliable Near/Far/Facing presence information is communicated to a real time communication system in a novel way using IR light sources and detection. Furthermore, user discrimination is performed in a novel way for any IR based system and ensures that the presence being detected belongs to the HMD of interest and that customized scaling of the viewed IM is possible. The presence information derived may be considered "high fidelity presence" information, as termed by the inventors.

In one example, a system for determining a user capacity to view a visual communication on a display device includes a display device, an infrared image capturing device, a first IR light source capable of being captured by the infrared image capturing device, and a second IR light source capable of being captured by the infrared image capturing device. The system includes an image processing module, such as an image processor software application or circuit, for determining a presence of a first IR light source object image and a second IR light source object image in a captured image output from the infrared image capturing device. The system further includes a user status determination module, such as a presence application, for translating an image processing module output to a user status indicating a user capacity to view a visual communication on the display device.

In one example, a method for determining a user capacity to view a visual communication includes capturing image data associated with a head mounted device, and processing the image data to determine the presence of a first IR light source image and a second IR light source image. The method further includes outputting a detection status of no object image detected, both the first IR light source image and the second IR light source image detected, or one of the first IR light source image and the second IR light source image detected. The method further includes translating the detection status to an associated user presence state.

In one example, a computer readable storage medium storing instructions that when executed by a computer cause the computer to perform a method for determining a user capacity to view a visual communication. The method includes capturing image data associated with a head mounted device, and processing the image data to determine the presence of a first IR light source image and a second IR light source image. The method further includes outputting a detection status of no object image detected, both the first IR light source image and the second IR light source image detected, or one of the first IR light source image and the second IR light source image detected. The method further includes translating the detection status to an associated user presence state.

FIG. 1 illustrates a simplified block diagram of an IR sensor system for user presence detection and display control. The IR sensor system includes a head mounted device 4 in communication with a base unit 2 using both an IR communication link 16 and a radiofrequency wireless link 14. Base unit 2 is connected to a personal computer with display 6 executing a presence application 7.

Figure 2:
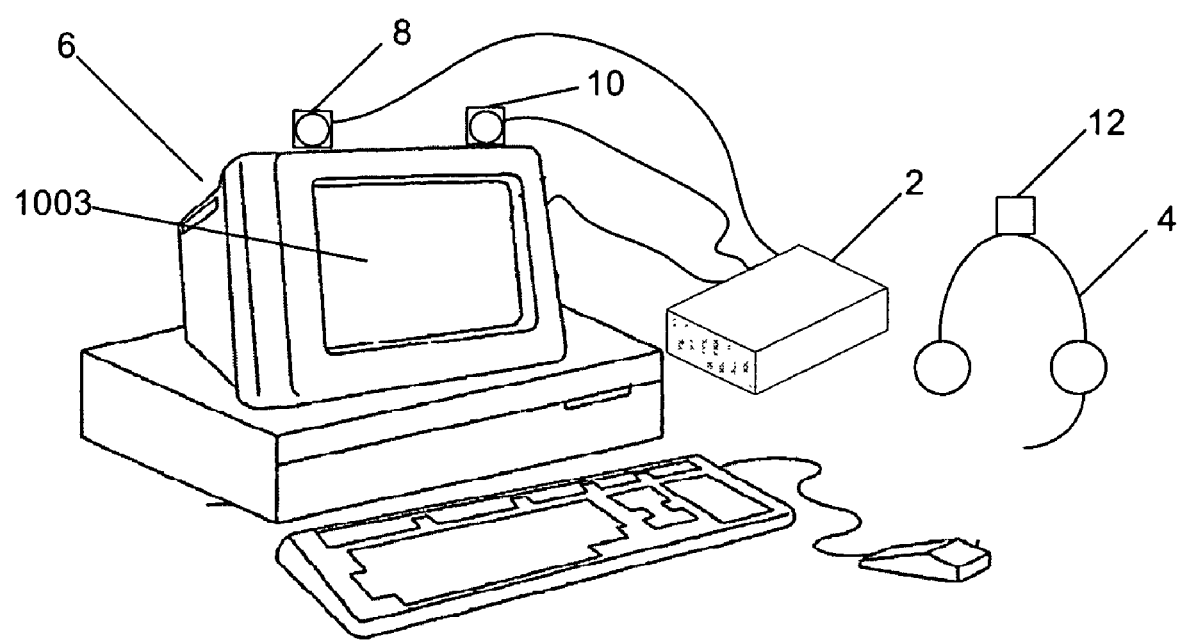
FIG. 2 is a diagram illustrating an external view of an example configuration of an IR sensor system and method for user presence detection and display control.

FIG. 2 is a diagram illustrating an external view of an example configuration of an IR sensor system for user presence detection and display control. The IR sensor system includes a base unit 2 having an IR light source 8 and IR light source 10. A head mounted device 4 includes an IR light detector. In the example shown in FIG. 2, the IR light detector is a 2-D IR camera 12. The term "detector" is used interchangeably with the term "sensor" herein. The base unit 2 is connected to a personal computer with display 6. Infrared light source 8 and IR light source 10 are separated by a predetermined known distance, and are provided in the vicinity of a display 1003 of personal computer with display 6. In the example shown in FIG. 2, IR light source 8 and IR light source 10 are on upper surface of the display 1003 and output IR light toward the front of the display 6.

As described below, in further configurations of the IR sensor system, the 2-D IR camera 12 may be co-located at the display 1003 and the head mounted device 4 may include IR light source 8 and IR light source 10. The number of IR light sources and IR light detectors in each example may also be varied.

Figure 3:
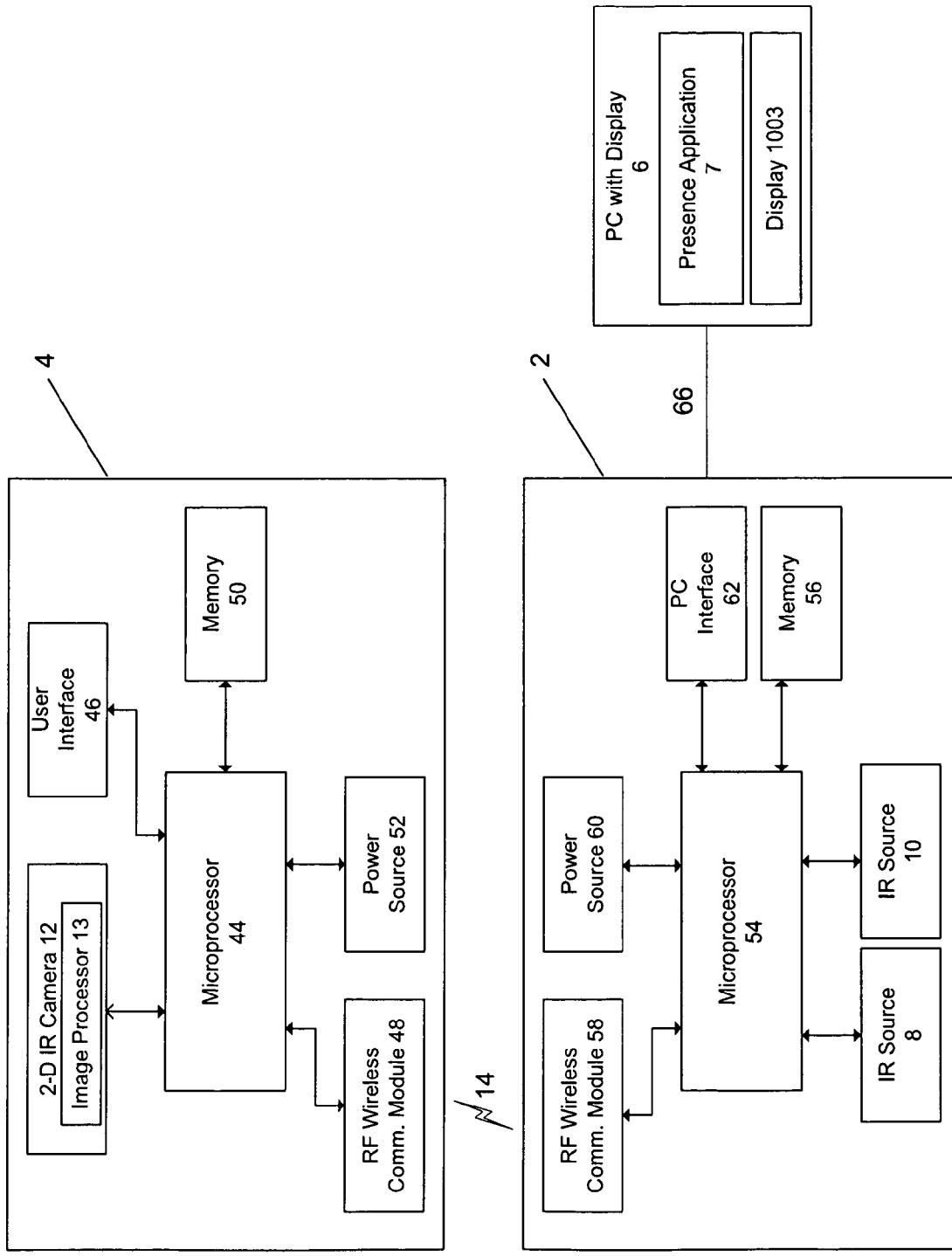
FIG. 3 illustrates a simplified block diagram of one example configuration of the system shown in FIG. 1.

FIG. 3 illustrates a simplified block diagram of one example configuration of the system shown in FIG. 1. The simplified block diagram shown in FIG. 3 corresponds to the configuration for which the external view is set forth in FIG. 2. Referring to FIG. 3, a base unit 2 includes a microprocessor 54 having access to a memory 56, a radiofrequency wireless module 58, and a PC interface 62. Microprocessor 54 controls an IR light source 8 and an IR light source 10. For example, IR light source 8 and IR light source 10 may both be IR light emitting diodes. A power source 60 provides the necessary power to the components of base unit 2. Personal computer with display 6 includes a presence application 7. Base unit 2 and head mounted device 4 communicate data over RF wireless link 14 between RF wireless communication module 58 and RF wireless communication module 48. In one example, RF wireless communication module 58 and wireless communication module 48 utilize the Bluetooth protocol.

Personal computer with display 6 and base unit 2 communicate over communication link 66 using PC interface 62. For example, communication link 66 may use a Universal Serial Bus (USB) interface. Personal computer with display 6 executes a program which results in the display of text and/or images on the screen of display 1003. For example, display 1003 may be an LCD monitor. Personal computer with display 6 also executes the presence application 7 which processes data to detect user presence and controls the display of text and/or images on the screen of display 1003 as described herein.

The head mounted device 4 includes a microprocessor 44 having access to a memory 50, an image capturing device such as a 2-D IR camera 12, user interface 46, and a radio frequency wireless communication module 48. A power source 52 such as a rechargeable battery provides the necessary power to the components of the head mounted device 4. 2-D IR camera 12 operates to capture an image viewed from the head mounted device 4 as described below. In particular, 2-D IR camera 12 captures an image of each of the IR light source 8 and IR light source 10 co-located at the display 1003 when these IR light sources are in view of 2-D IR camera 12. The presence application 7 uses images output from the 2-D IR camera 12 to obtain user presence information corresponding to a distance and orientation of the head mounted device 4 with respect to the display 1003. For example, the captured images output are processed to identify the presence or absence of object images corresponding to IR light source 8 and IR light source 10.

2-D IR camera 12 is integrated with the head mounted device 4 housing, which includes an aperture on a front surface allowing IR light to be received by the 2-D IR camera 12. The 2-D IR camera 12 is positioned to view a direction aligned with a user sight line when the head mounted device 4 is worn by the user. An image processor 13 analyzes image data captured by 2-D IR camera 12 to determine the presence of high luminous exposure areas in the image. The location and size of any high luminous exposure areas within the 2-D grid of the 2-D IR camera 12 is also determined. In one example, the image processor 13 has a sampling cycle of 100 Hz, and can therefore detect data being transmitted by the IR light sources 8 and 10 by means of source modulation such as ON/OFF keying. Image processor 13 may be implemented as an image processing circuit or image processing application.

2-D IR camera 12 may include a lens, IR filter, allowing only IR light to pass through, an image capturing device, and an image processor 13. In one example, the image capturing device is a charged coupled device (CCD) or CMOS censor. IR light source 8 and IR light source 10 co-located in the vicinity of display 1003 output IR light toward the front of the monitor. If the 2-D IR camera 12, and therefore the head mounted device 4, is directed towards the front of the monitor, the IR light passes through the lens and IR filter to impinge upon the image capturing device to create an object image. The image processor 13 calculates the positions of objects (i.e., IR light source 8 or IR light source 10) whose images are to be captured in the captured image. The image processor 13 outputs captured image data including coordinate values indicating the positions of the IR light source 8 object image and the IR light source 10 object image in the captured image to the microprocessor 44. Also output is captured image data indicating whether one IR light source object image appears, both IR light source object images appear, or no IR light source object images appear in the captured image. The captured image data output is transmitted to presence application 7 which utilizes the captured image data to determine a user presence status as described below.

Figure 4:
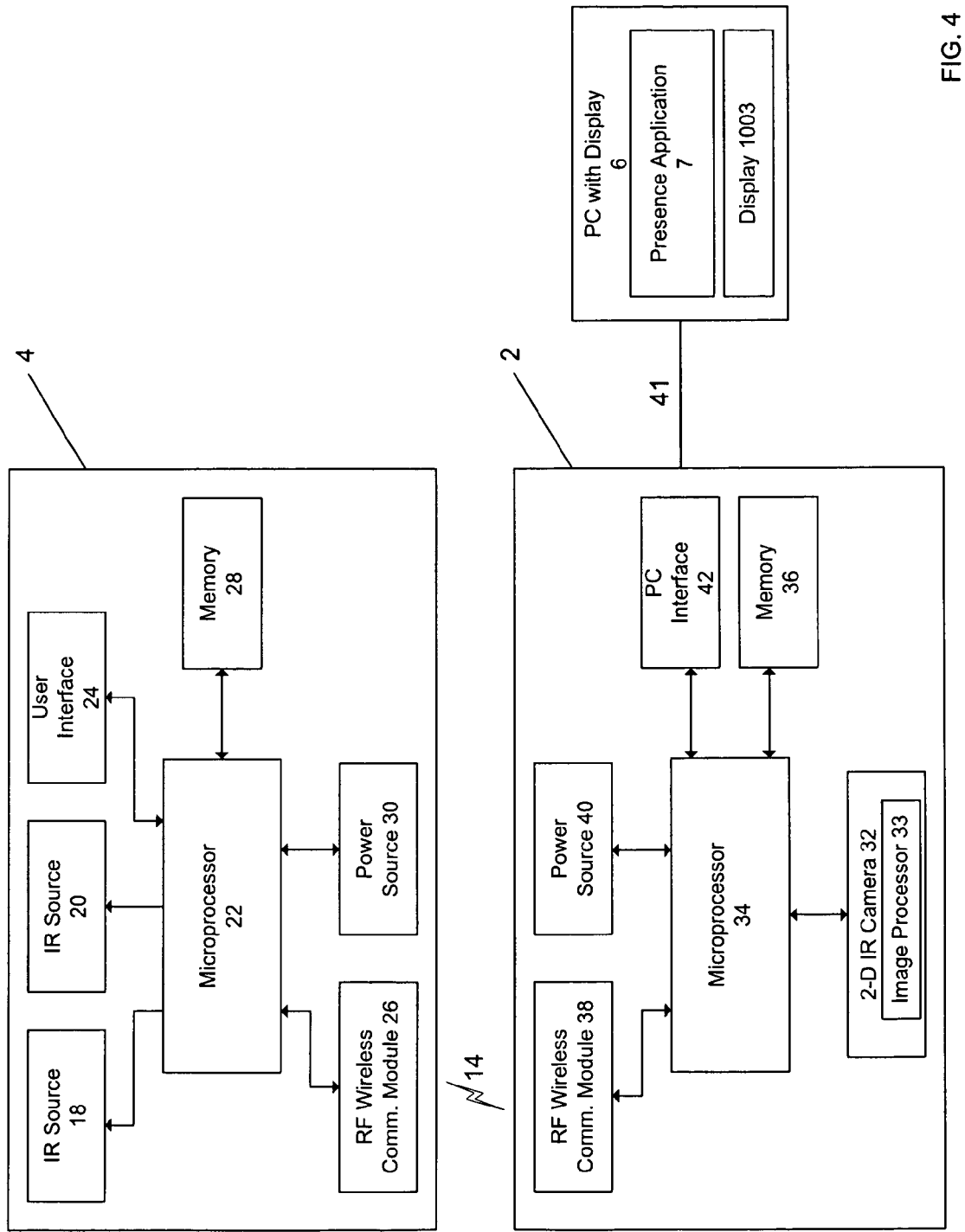
FIG. 4 illustrates a simplified block diagram of a further example configuration of the system shown in FIG. 1.

FIG. 4 illustrates a simplified block diagram of a further example configuration for select components of the system shown in FIG. 1. In the configuration shown in FIG. 4, the first IR light source and the second IR light source are disposed at the head mounted device and the image capturing device is disposed in proximity to the display device. Referring to FIG. 4, a base unit 2 includes a microprocessor 34 having access to a memory 36, an image capturing device such as a 2-D IR camera 32, a radiofrequency communication module 38, and a PC interface 42. A power source 40 provides the necessary power to the components of base unit 2. Personal computer with display 6 includes a presence application 7.

The head mounted device 4 includes a microprocessor 22 having access to a memory 28, a user interface 24, and a radio frequency wireless communication module 26. Microprocessor 22 controls an IR light source 18 and an IR light source 20. For example, IR light source 18 and IR light source 20 may both be IR light emitting diodes. A power source 30 such as a rechargeable battery provides the necessary power to the components of the head mounted device 4.

Base unit 2 and head mounted device 4 communicate data over RF wireless link 14 between RF wireless communication module 38 and RF wireless communication module 26. In one example, RF wireless communication module 38 and wireless communication module 26 utilize the Bluetooth protocol.

Personal computer with display 6 and base unit 2 communicate over communication link 41 using PC interface 42. For example, communication link 41 may use a Universal Serial Bus (USB) interface. Personal computer with display 6 executes a program which results in the display of text and/or images on the screen of display 1003. For example, display 1003 may be an LCD monitor. Personal computer with display 6 also executes the presence application 7 which processes data to detect user presence and controls the display of text and/or images on the screen of display 1003 as described herein.

In one example, IR light source 18 and IR light source 20 are each disposed on the head mounted device 4 such that they are in proximity to a user ear, and thus separated by the width of the user head. The 2-D IR camera is placed in proximity to the display 1003, such as centered on an upper surface of display 1003. The operation and structure of 2-D IR camera 32, image processor 33, IR light source 18, and IR light source 20 is substantially the same as that described above in reference to FIG. 3.

Figure 5:
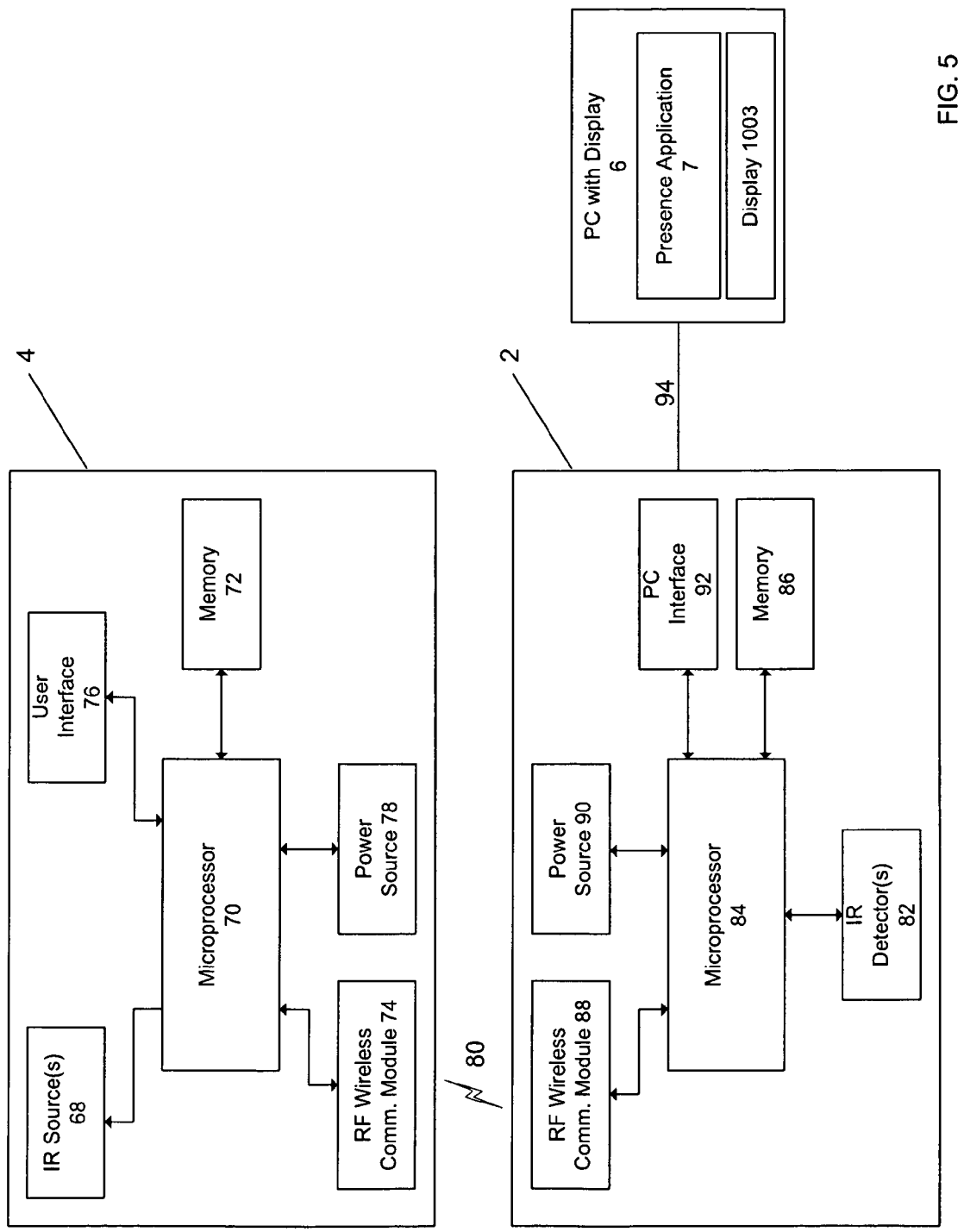
FIG. 5 illustrates a simplified block diagram of a further example configuration of the system shown in FIG. 1.

FIG. 5 illustrates a simplified block diagram of a further example configuration of the system shown in FIG. 1. In the configuration shown in FIG. 5, one or more IR lights sources 68 are disposed at the head mounted device 4 and one or more IR detectors 82 are disposed in proximity to the display device. Referring to FIG. 5, a base unit 2 includes a microprocessor 84 having access to a memory 86, one or more IR detector(s) 82, a radiofrequency communication module 88, and a PC interface 92. A power source 90 provides the necessary power to the components of base unit 2. Personal computer with display 6 includes a presence application 7 and a display 1003. IR detector(s) 82 may, for example, be a 2-D IR camera or one or more photodetectors.

The head mounted device 4 includes a microprocessor 70 having access to a memory 72, a user interface 76, and a radio frequency wireless communication module 74. Microprocessor 70 controls one or more IR light sources 68. A power source 78 such as a rechargeable battery provides the necessary power to the components of the head mounted device 4.

Base unit 2 and head mounted device 4 communicate data over RF wireless link 80 between RF wireless communication module 88 and RF wireless communication module 74. In one example, RF wireless communication module 88 and wireless communication module 74 utilize the Bluetooth protocol.

Personal computer with display 6 and base unit 2 communicate over communication link 94 using PC interface 92. For example, communication link 94 may use a Universal Serial Bus (USB) interface. Personal computer with display 6 executes a program which results in the display of text and/or images on the screen of display 1003. For example, display 1003 may be an LCD monitor. Personal computer with display 6 also executes the presence application 7 which processes data to detect user presence and controls the display of text and/or images on the screen of display 1003 as described herein. Example configurations of IR light source(s) 68 and IR detector(s) 82 are illustrated below in reference to FIGS. 15A-15D.

Figure 6:
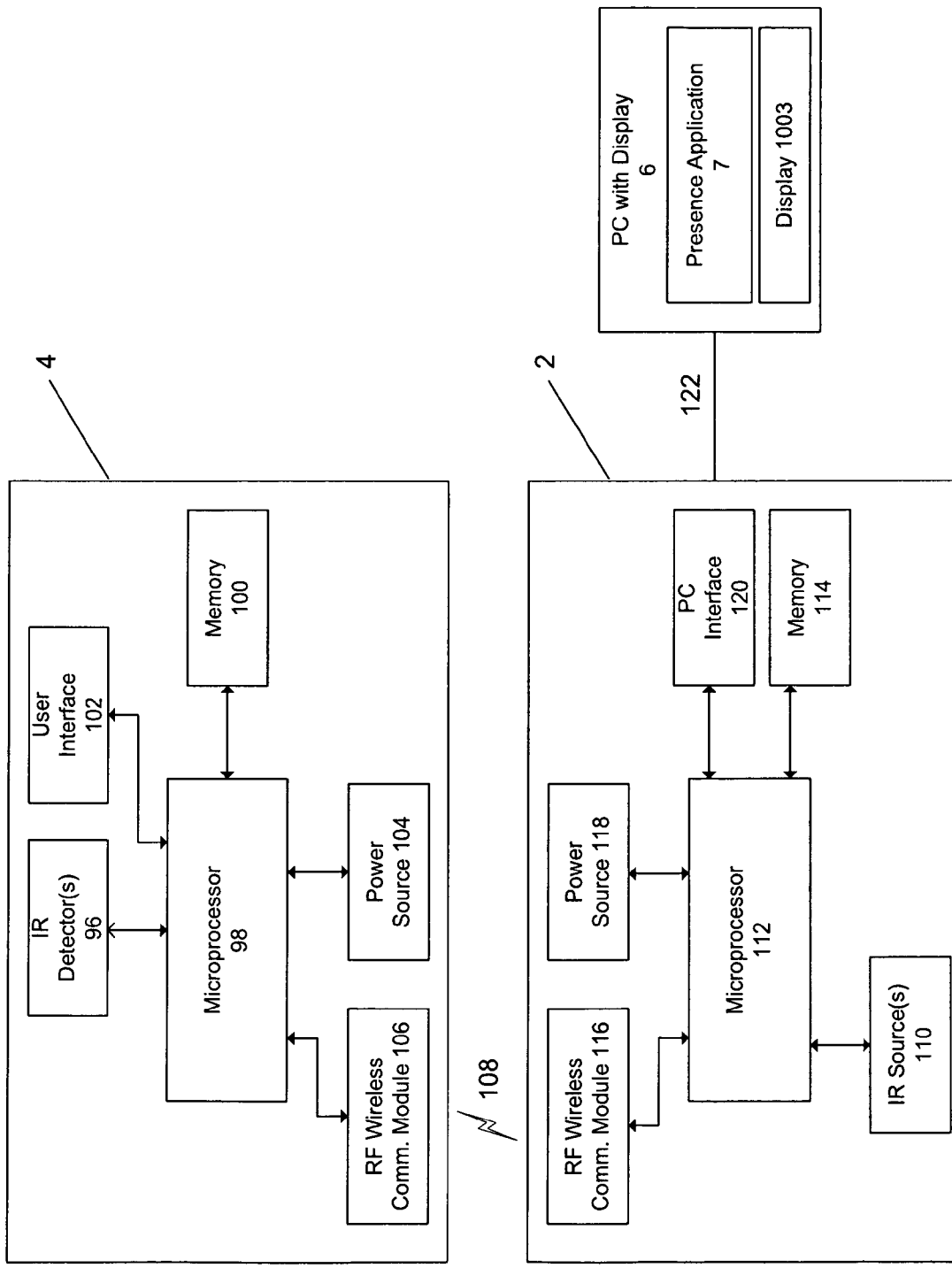
FIG. 6 illustrates a simplified block diagram of a further example configuration of the system shown in FIG. 1.

FIG. 6 illustrates a simplified block diagram of a further example configuration of the system shown in FIG. 1. In the configuration shown in FIG. 6, a base unit 2 includes a microprocessor 112 having access to a memory 114, a radiofrequency communication module 116, and a PC interface 120. Microprocessor 112 controls one or more IR light source(s) 110, depending upon the particular implementation. A power source 118 provides the necessary power to the components of base unit 2. Personal computer with display 6 includes a presence application 7. Base unit 2 and head mounted device 4 communicate data over RF wireless link 108 between RF wireless communication module 116 and RF wireless communication module 106. In one example, RF wireless communication module 116 and wireless communication module 106 utilize the Bluetooth protocol.

Personal computer with display 6 and base unit 2 communicate over communication link 122 using PC interface 120. For example, communication link 122 may use a Universal Serial Bus (USB) interface. Personal computer with display 6 executes a program which results in the display of text and/or images on the screen of display 1003. For example, display 1003 may be an LCD monitor. Personal computer with display 6 also executes the presence application 7 which processes data to detect user presence and controls the display of text and/or images on the screen of display 1003 as described herein.

The head mounted device 4 includes a microprocessor 98 having access to a memory 100, one or more IR detector(s) 96, user interface 102, and radio frequency wireless communication module 106. A power source 104 such as a rechargeable battery provides the necessary power to the components of the head mounted device 4. Each IR detector(s) 96 operate(s) to detect an IR light source viewed from the head mounted device 4. The configuration shown in FIG. 6 operates substantially similar to the configuration illustrated in FIG. 5, except that the relative positions of the IR detector(s) and IR light source(s) are switched between the base unit 2 and the head mounted device 4.

In FIG. 5, the IR source(s) 68 may be part of an IR transceiver at the head mounted device 4 having both an IR transmitter and receiver. Similarly, IR detector(s) 82 may be part of an IR transceiver at the base unit 2 having both an IR transmitter and receiver. In FIG. 6, the IR detector(s) 96 may be part of an IR transceiver at the head mounted device 4 having both an IR transmitter and receiver. Similarly, IR source(s) 110 may be part of an IR transceiver at the base unit 2 having both an IR transmitter and receiver. Utilizing IR transceivers at the head mounted device 4 and base unit 2 allows for bi-directional communications as well as verification of range measurements.

FIGS. 7A, 7B, 8, and 9 are diagrams which generally illustrate use situations of the system illustrated in FIG. 3 where user presence status is determined. As illustrated in FIGS. 7A, 7B, 8, and 9, a user 124 wearing a head mounted device 4 having a 2-D IR camera 12 is seated in front of a display 127. The head mounted device 4 is constructed so that when worn by user 124, 2-D IR camera 12 is oriented with the line of sight 126 of the user. In this example, IR light source 8 and IR light source 10 are co-located at the display 127 a pre-determined width apart on a top surface of the display 127.

Each IR light source 8 and IR light source 10 emits IR light within a visual field angle range, herein after referred to as the IR light source visual field angle range. The 2-D IR camera 12 can receive light within a certain visual field angle range, herein after referred to as the camera visual field angle range. When the head mounted device 4 is directed at the display such that both IR light sources are present within the camera visual field angle range and the head mounted device 4 is present within the IR light source visual field angle range of both IR light sources, the head mounted device 4 can detect both IR light source 8 and IR light source 10. The 2-D IR camera 12 captures an image of each of the IR light source 8 and the IR light source 10, where the captured image includes the object image of the IR light source 8 and the IR light source 10. When the head mounted device 4 is directed away from the display such that neither IR light sources are present in the camera visual field angle range, the head mounted device 4 cannot detect either IR light source 8 or IR light source 10. When the head mounted device 4 is directed partially towards the display such that only one of IR light source 8 and IR light source 10 are present in the camera visual field angle range, the head mounted device 4 can detect only a single IR light source.

An IR reflection off a surface can occur resulting in a false position or orientation detection. However, it is possible to set camera detection thresholds to reduce the likelihood of reflection detections as it is most likely significantly lower in amplitude, especially in specular (non-mirror like) reflections. Additionally, it is possible to determine if both received signals are roughly of equal strength to avoid the case where one source is reflected and one is not, to further reduce the chance of a false detection of the user facing the screen.

When worn by the user 124, the image captured by 2-D IR camera 12 varies based on the distance of the user 124 from the display 127, the orientation of the user 124, and the user line of sight 126. As a result, user presence information associated with user orientation and distance from the display is generated from images captured by 2-D IR camera 12. The presence information is updated automatically as the user 124 changes his or her orientation with respect to the display 127, or moves closer or farther from the display 127.

FIGS. 7A and 7B are diagrams illustrating example user presence states which are detected. FIG. 7A illustrates a user 124 viewing a display 127, where the user's line of sight 126 is directed at the display 127. In this example, the user 124 illustrated in FIG. 7A is considered to have a user presence status of "facing the display device". The user 124 is located a distance D1 128 from the display 127. Similarly, FIG. 7B illustrates a user 124 viewing a display 127, where the user's line of sight 126 is also directed at the display 127. However, in FIG. 7B the user 124 is located a distance D2 130 from the display 127, where the value of distance D2 130 is greater than the value of distance D1 128. In an example where distance D1 128 is less than a predetermined Near/Far distance value D3, the user 124 illustrated in FIG. 7A is considered to have a user presence status of "near". In an example where distance D2 130 is greater than the predetermined Near/Far distance value D3, the user 124 illustrated in FIG. 7B is considered to have a user presence status of "far". Both the value of distance D1 128 and D2 130 are calculated as described below. The value of distance D1 128 and D2 130 may also be reported as presence information.

FIGS. 8 and 9 are diagrams illustrating additional example user presence states which are detected. FIG. 8 illustrates a user 124 having a line of sight 132 which is not directed at display 127. In this example, the user illustrated in FIG. 8 is considered to have a user presence status of "not facing the display device". FIG. 9 also illustrates a user 124 having a line of sight 132 which is not directed at display 127. In this example, the user illustrated in FIG. 9 is considered to have a user presence status of "not facing the display device". In certain examples, as described below, the IR sensor system distinguishes between the user illustrated in FIG. 8, who is generally oriented toward, but not directly viewing the display 127, and the user illustrated in FIG. 9, whose line of sight 134 is in an opposite direction from display 127.

FIGS. 10-13 are diagrams illustrating a change in captured images when the orientation or distance of the head mounted device 4 is changed, as illustrated in the use situations shown in FIGS. 7A, 7B, 8, and 9. By detecting the presence and positions of object images corresponding to the first IR light source and the second IR light source in the captured images, the pointed direction and location of the head mounted device is determined.

A process by which the presence and positions of object images corresponding to the first IR light source and the second IR light source are detected in the captured images output from the IR camera will be described in reference to FIG. 10. The image processor 33 processes the image data of a captured IR image 136 to detect coordinates of the object images. The detected coordinates may use an X-Y coordinate system where an X-axis may be designated to be parallel to the width of the IR image 136 and a Y-axis may be designated to be parallel to the height of the IR image 136. These designations are arbitrary, and the x-y origin can be anywhere in the x-y plane, including out of camera image, and the x-y axis can be rotated anywhere in the plane. The image processor 33 detects an IR light object image by identifying high luminous exposure areas within the captured IR image 136. The detected IR source image is required to be above a predetermined luminous exposure threshold and the so-detected IR image contained within an x-y plane size threshold circle of predetermined radius centered on the image. Any image detected above the exposure threshold and within this circle at sample time is considered to be the same IR source. The coordinate data of each object image detected is utilized as described herein.

One of ordinary skill in the art will recognize that although the detection of the object images is described as being performed by the image processor 33 at either the head mounted device 4 or the base unit 2, captured images may be transferred to personal computer with display 6 where a comparable image processor circuit or application can perform the detection of the object images.

Figure 10:
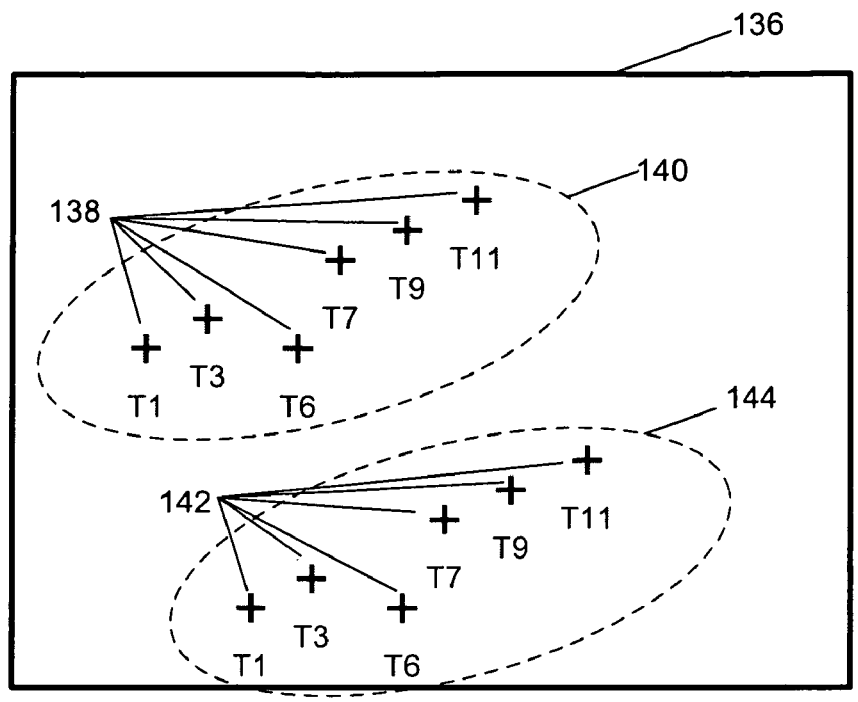
FIG. 10 is a diagram illustrating a captured IR image showing detection of two valid IR sources at a first distance.

FIG. 10 is a diagram illustrating an overlay of successive captured IR images 136 showing detection of two valid IR sources at a first distance, corresponding to the use situation illustrated in FIG. 7A where a user is facing the display device. In FIG. 10, the captured IR images include detections 138 corresponding to a first IR light source as well as detections 142 corresponding to a second IR light source. As described previously, where a user is facing the display device, both the first IR light source and the second IR light source are detected by the 2-D IR detector as object image detections.

FIG. 10 also illustrates detection of the first IR light source and the second IR light source over time where the IR light source and the second IR light source are moving and modulated to transmit unique data like a physical address. In this manner, where the unique data is known to be valid, a valid IR light source can be identified from the captured IR images.

This is particularly advantageous where the IR light sources are located at the head mounted device. In this manner, head mounted devices (and therefore users of such head mounted devices) can be distinguished from one another. In this example, the IR light sources on the head mounted device are periodically pulsing a (possibly encrypted) unique string of data that identifies the headset (a MAC address for example) of the head mounted device. The effect is that the sources appear as blinking sources in the X-Y data detected at the 2-D IR camera. A software client receiving the IR source X-Y information has previously received the unique data (like physical address of the head mounted device) from hardcoding, programming, or initial linking through a different wireless or wired communication (for example, Bluetooth). For example, this software client may be located at the base unit or the personal computer with display. The use of valid sources allows the IR detection system to know who it detecting, allowing it to ignore unintended sources and to furthermore customize behavior based on the user it is detecting.

For each blinking IR light source, the detected X-Y data is passed on to the application on the base unit or PC with display. A moving head mounted device will show clusters of X-Y data for each source as it blinks on and off. Each detection T1, T3, T6, etc. represents a captured image at a time Tn, where the frequency of capture may be varied. Thus, a cluster 140 of detections 138 correspond to detection of a first light source, and a cluster 144 of detections 142 correspond to detection of a second light source. In the example shown in FIG. 10, the physical address is 10100110101 and the source is on (1) or off (0) at the data clock according to this address. The sources are therefore seen by the 2-D IR camera from a source with this physical address at Tn: 1,3,6,7,9,11 where T is the data clock and n is the index. A "1" is the presence of the IR source at Tn and a "0" is the absence of the source.

The data clock rate is constrained by the camera sampling rate and resolution. The camera sampling rate and pixel resolution of the 2-D IR camera is selected to be sufficiently high so that the detections of the two sources can be tracked and not confused with each other. The farther the camera is from the sources, the closer the locations (in pixels) of the two source images can be for a given time. The faster the user is moving, the more pixels are covered for a given sample time. When user distances and/or movement speed are not limited by sample rate and resolution, position cluster 140 can be resolved into a relative position and orientation.

It is necessary to track a detected IR light source over successive captured images. This prevents confusion over which IR light source an object image corresponds to where there are multiple IR light sources. By tracking an IR light source over successive captured images, the transmitted unique data (e.g., physical address) can be properly identified. In one example, a detected IR light source is tracked by determining whether an object image appearing in a later captured image is within a certain radius of an object image appearing in an earlier captured image.

The camera sample rate is selected to be sufficient to detect the on and off of the images, where the sample rate must be greater than two times the data rate to avoid aliasing. For example, if the camera sampling rate is 100 Hz, the maximum data rate is 50 bits/sec. Thus, unique data (say a physical address) could be communicated with at most 50 bits every second for a camera sampling rate of 100 Hz, but most likely less for reliable transmission. More bits are possible with a faster camera sample rate. To achieve maximum bit rate, a training sequence of alternating 1 and 0 can be used to allow the 2D IR camera to synchronize its sampling to the IR light sources for improved data reception.

In one example, validation of specific users is used to automatically adjust the settings related to factors such as Near/Far status determination, and the quantity of scaling of text and images. In this manner, factors such as a particular valid user's eyesight are automatically accounted and adjusted for by the system. Scaling of text and images appearing on the display device may also be adjusted manually by the user via the user interface of the head mounted device both for fine tuning and also to set the parameter used for calculating scaling factor versus distance for the individual user.

Figure 11:
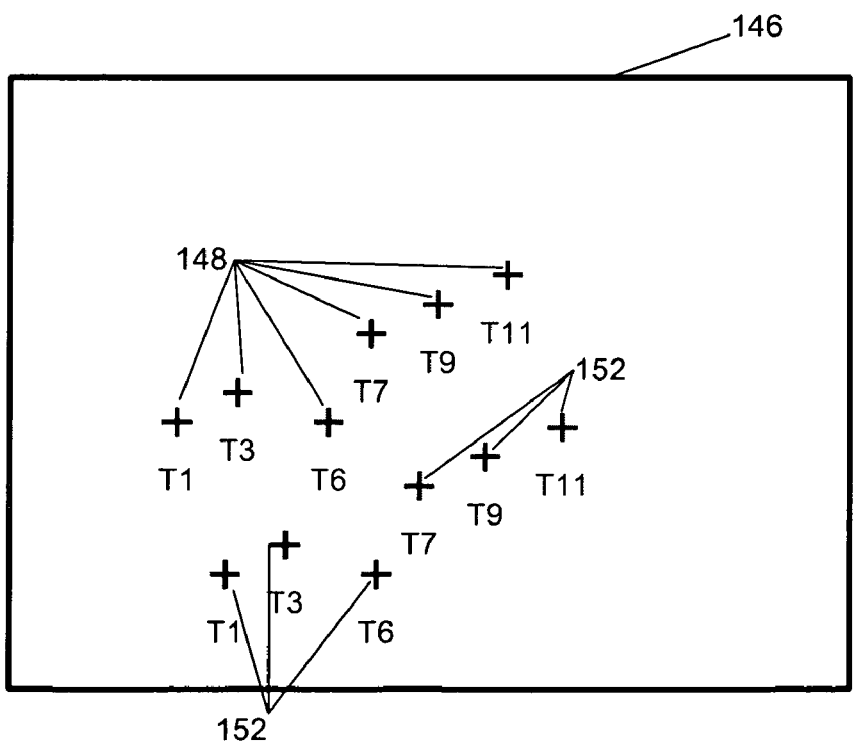
FIG. 11 is a diagram illustrating a captured IR image showing detection of two valid IR sources at a second distance greater than the first distance shown in FIG. 10.

FIG. 11 is a diagram illustrating captured IR images 146 showing detection of two valid IR sources at a second distance greater than the first distance shown in FIG. 10, corresponding to the use situation illustrated in FIG. 7B where a user is facing the display device. In FIG. 11, the captured IR images 146 include detections 148 corresponding to a first IR light source as well as detections 152 corresponding to a second IR light source. The distance between each detection 148 and detections 152 at a given time T is shorter than the distance between each detection 138 and detections 142 as a result of the greater distance between the head mounted device and IR light sources. Thus, by detecting the distance between the object images of the first IR light source and the second IR light source appearing in the captured image, a shifted state (e.g., nearer or farther) concerning the distance between the head mounted device and the display device can be determined.

The distance D1 128 and D2 130 between the user wearing the head mounted device and the display device can be calculated using scaling. The default distance (say sitting in front of a terminal) creates an image in the 2-D IR camera. If the user moves farther away, the separation of the image in the camera scales approximately as $R1/R2=D2/D1$ where R2 is the new range, D2 is the new image separation, and R1, D1 are the respective default range and image separation respectively. For example, if the default image separation is 500 pixels at two feet, then if the image subsequently appears to have a separation of 100 pixels, the user must be standing at 10 feet away from the camera. If more accuracy is needed, the relationship between image separation and range can be calculated mathematically based on the geometry of the system. Alternatively, the relationship can be measured empirically.

Figure 12:
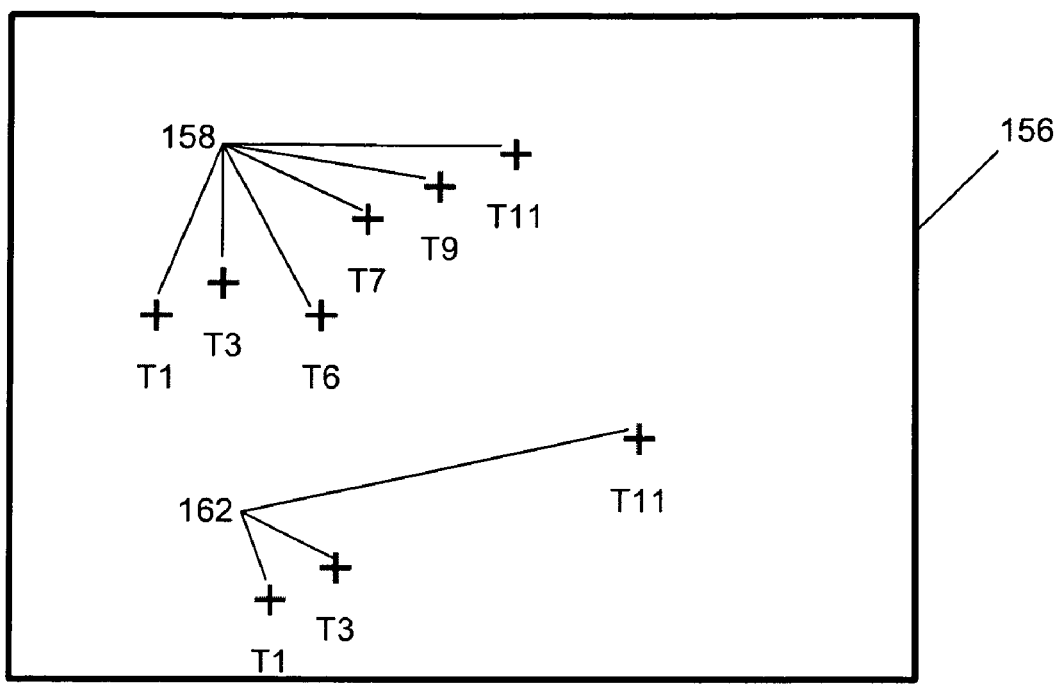
FIG. 12 is a diagram illustrating a captured IR image showing detection of one valid IR source.

FIG. 12 is a diagram illustrating captured IR images 156 showing detection of one valid IR light source, corresponding to the use situation illustrated in FIG. 8 where a user is generally oriented toward, but not directly viewing the display. In this use state, for example, the pointing direction of the head mounted device is turned to the left or right so that only one IR light source is in view of the 2-D IR camera. As a result, as shown in FIG. 12, the captured IR images 156 include only detections 158 corresponding to a single IR light source. The captured IR images 156 may also include random detections 162 resulting from noise or interference which are discarded. In this use state, the user may be facing the display, but interference may block the detection of one of the IR light sources.

Figure 13:
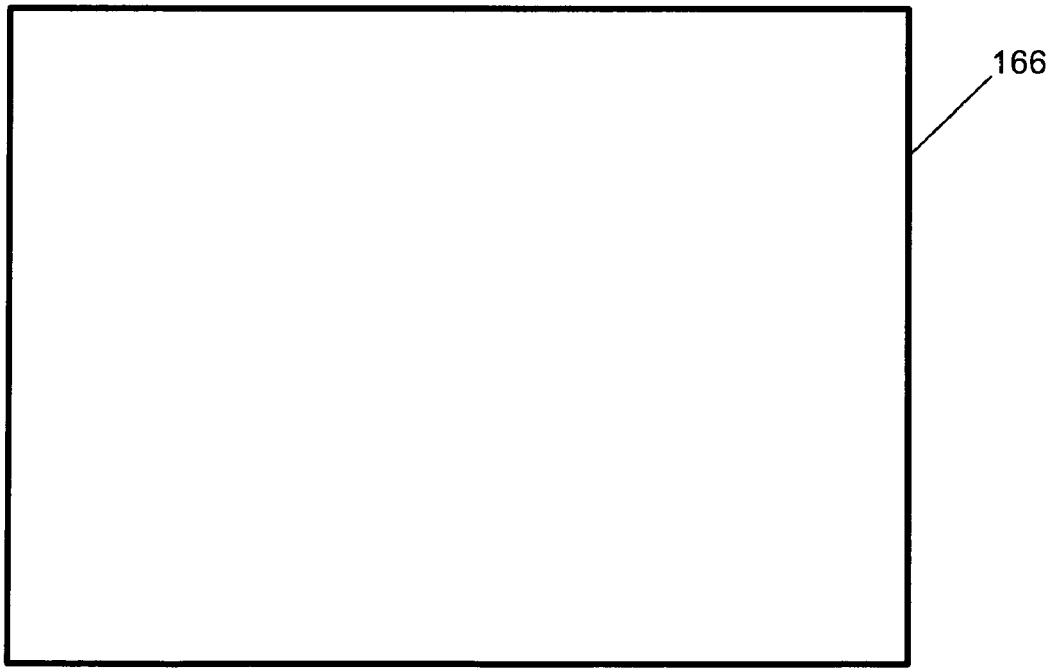
FIG. 13 is a diagram illustrating a captured IR image showing detection of no valid IR sources.

FIG. 13 is a diagram illustrating a captured IR image 166 showing detection of no valid IR sources, corresponding to the use situation illustrated in FIG. 9 where a user is oriented away from the display device. In this use state, the pointing direction of the head mounted device is sufficiently away from the display such that no IR light sources are in view of the 2-D IR camera. As a result, as shown in FIG. 13, the captured IR images 156 include no detections.

Upon receipt of the data from the image processor, including the number of IR light source objects in the captured image and identification of their respective coordinate positions along an x-y axis, the presence application 7 determines the orientation and distance of the head mounted device with respect to a display device, and the orientation and distance can be used to generate user presence information by presence application 7. In one example, the generated presence information includes near/far status, facing the display status, and not facing the display status. Alternatively, the orientation and distance of the head mounted device with respect to the display device can be determined at the image processor.

One of ordinary skill in the art will recognize that the image data illustrated in FIGS. 10 to 13 may be interpreted to correspond to different user presence states than that described in the examples herein. The specific parameters for a given presence state or the particular nomenclature given a presence state may differ depending on a vendor specific presence application. For example, a "near status" can be determined based upon the distance between the user and the display device or whether one or both IR light sources are detected. Similarly, a "facing the display device" status can be defined to mean either directly viewing the display device (e.g., 2 IR light sources detected) or indirectly viewing the display device (e.g., 1 IR light source detected). Furthermore, additional presence states and nomenclature can be defined, such as "directly facing the display" or "indirectly facing the display".

Figure 14A:
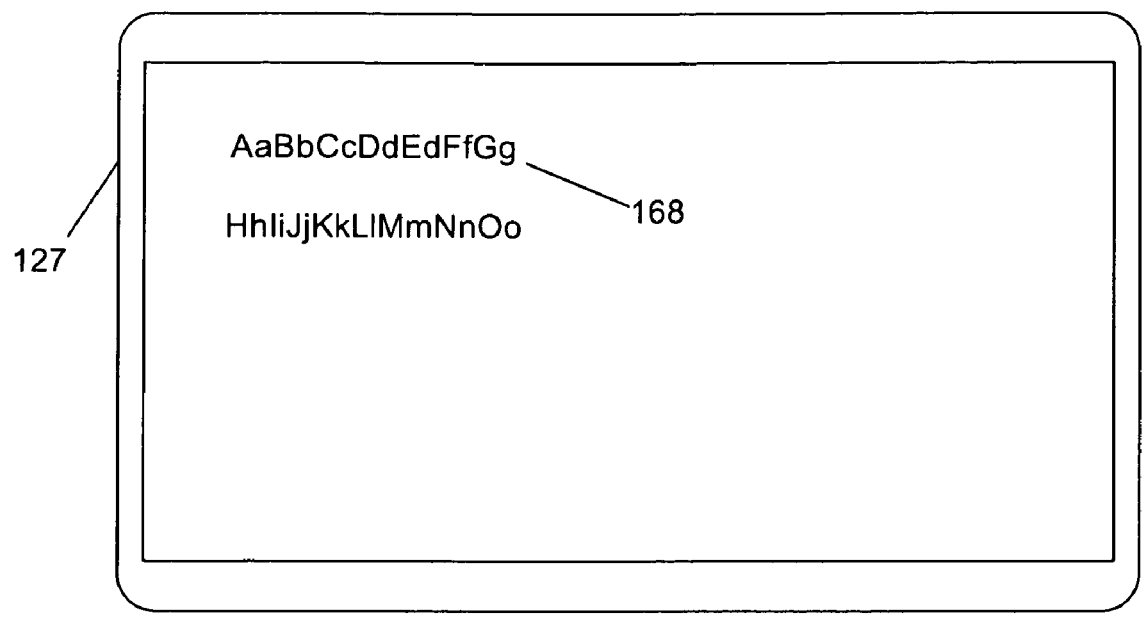
FIGS. 14A and 14B are screenshots of a visual display illustrating scaling of text or image size responsive to the user distance from the visual display.
Figure 14B:
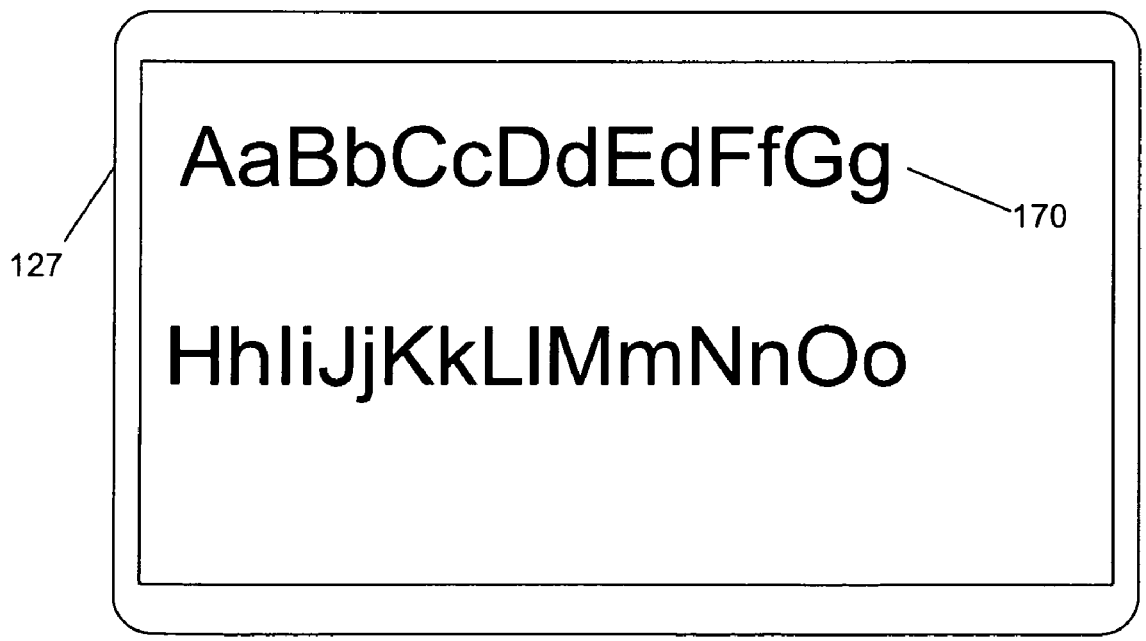

FIGS. 14A and 14B are screenshots of a visual display illustrating scaling of text or image size responsive to the user distance from the visual display. In one example, the presence application 7 scales a visual communication size output on the display 127 responsive to the user status. In the example shown in FIG. 14B, a text block 170 is increased in size compared to a text block 168 shown in FIG. 14A, corresponding to a shift in user status from "near" to "far", as shown in FIG. 7A and FIG. 7B. Alternately, the size of the visual communication output on the display 127 may be continually increased or decreased in response to increasing or decreasing distance of the user from the display 127.

FIGS. 15A to 15D are diagrams illustrating example user presence states related to the user orientation and position with respect to a visual display 185 which are detected. In FIGS. 15A to 15D, a head mounted device in the form of headset 174 includes a plurality of IR light sources with different orientations. For example, headset 174 may be a telecommunications headset having a microphone and receiver for voice communications. In a further example, headset 174 may also be a stereo listening headset. When the headset 174 is worn by a user 172, an IR light source 176 and IR light source 178 have a visual field angle directed forward to the user 172 along the user's line of sight. IR light source 176 and IR light source 178 are spaced apart by a known distance to allow calculation of distance information from the IR detector, as described above. Headset 174 includes an IR light source 182 directed toward the rear of user 172, and an IR light source 180 directed toward one side of the user 172. In the example shown in FIGS. 15A to 15D, personal computer with display 184 includes an IR light sensor 188 with a field of view directed towards the front of the display 185, an IR light sensor 186 directed to one side of the display 185, and an IR light sensor 190 directed to the other side of the display 185. Depending upon the desired application, IR light sensor 190 or 185 or 186 may be a O-D IR detector, such as a photodiode, or a 2-D IR camera as described earlier.

Referring to FIGS. 15A-15C, the IR light sensor 188 can detect that the user 172 is either "present" or "not present" regardless of the user orientation. In FIG. 15A, IR light sensor 188 detects IR light sources 176 and 178 if the user 172 is facing the display 185. In FIG. 15B, the IR light sensor 188 detects IR light source 180 if the user is facing to the side of the display 185. In FIG. 15C, the IR light sensor 188 detects IR light source 182 if the user if facing in a direction opposite the display 185. In FIG. 15D, the IR sensor 190 detects whether the user 172 has moved to the side of the display 185. The IR sensor 190 detects whether the user 172 has moved to the side of the display 185 regardless of which orientation the user 172 is facing in a manner similar to that described in reference to FIGS. 15A-15C.

Depending on the desired application, the IR sensor may or may not distinguish between the different user orientation states, i.e., the different IR light sources. In this application, the desired information is whether the user is present, and the user's particular orientation is not needed. In further application, the IR sensor may distinguish between the different IR light sources at the headset 174. For example, each IR light source at the headset 174 may output a different unique pattern which is recognized at the IR sensor. One of ordinary skill in the art will recognize that a variety of techniques may be used to identify the user orientation based on distinguishing the different IR light sources. For example, an "exclusive or" operation may be performed with the IR light source number and the unique ID on/off pattern being sent, the user orientation may be appended in data to the unique ID pattern, or different IR frequencies may also be used. In a further example, time-sequenced LED patterns (each one sent in a given time slot) are utilized. A start pulse is sent over the Bluetooth link from the receiver end, and depending on the time slot when the pattern is received, the IR light source is identified.

Figure 21:
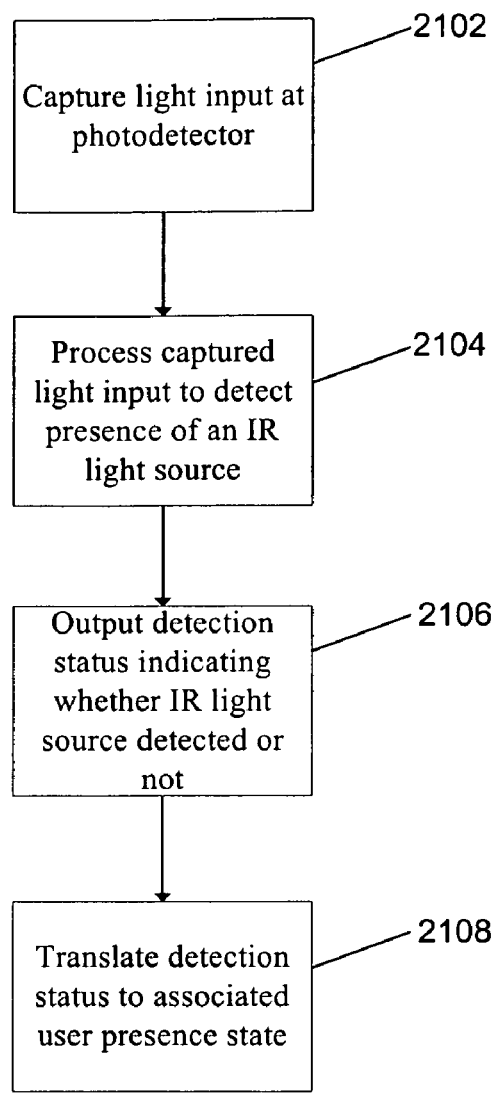
FIG. 21 is a flow diagram illustrating reporting of user presence data in a further example by the IR sensor system and method for user presence detection and display control.

One of ordinary skill in the art will recognize that the number and placement of IR light sources at the headset 174 and the number and placement of the IR light sensors at the display 185 may be varied in further examples dependent on the desired user presence states to be monitored. In one example, referring to the method illustrated in FIG. 21, only a single IR light source is used in conjunction with a single IR light sensor. FIG. 21 is a flow diagram illustrating a method for reporting of user presence data where a headset includes a single IR light source and a single photodetector is placed at the display, or where a headset includes a single photodetector and a single IR light source is placed at the display. At block 2102, the light input to a photodetector is captured. At block 2104, the captured light input is processed to detect the presence of an IR light source. At block 2106, a detection status is output indicating whether the IR light source is detected or not. At block 2108, the detection status is translated to an associated user presence state. For example, if the detection status indicates the IR light source is detected, then this may be translated to a "facing the display" presence state. In this case, the IR light beam emitted from the IR light source is designed to be sufficiently narrow so that detection occurs by the photodetector only when the user is facing the display.

Figure 16B:
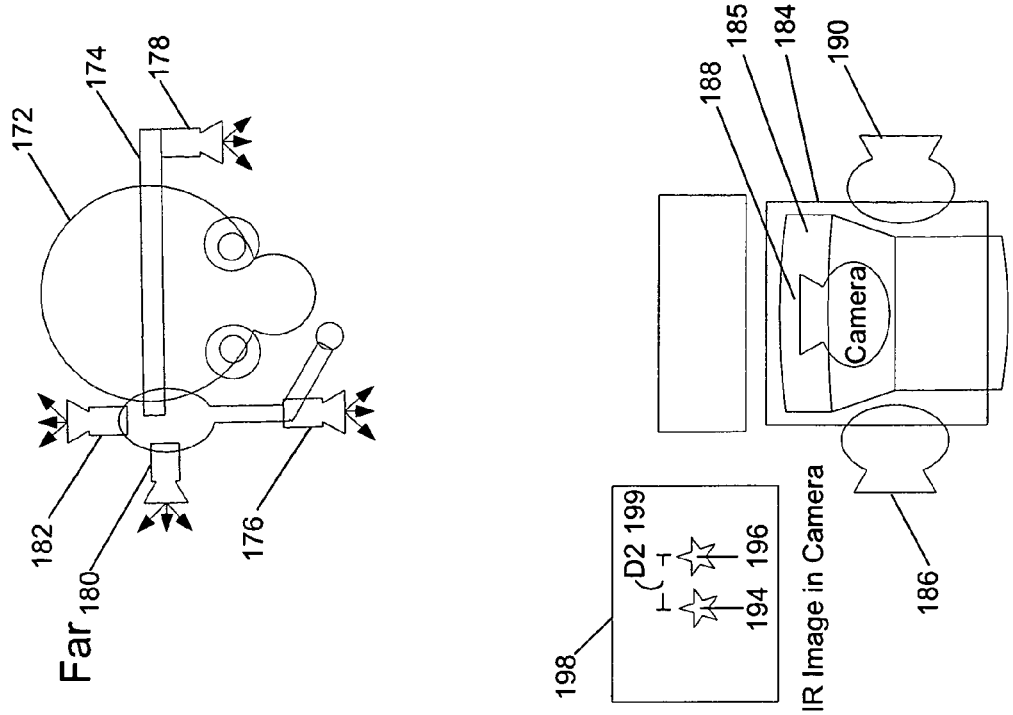
FIGS. 16A and 16B are diagrams illustrating example user presence states related to the user distance from a visual display.
Figure 16A:
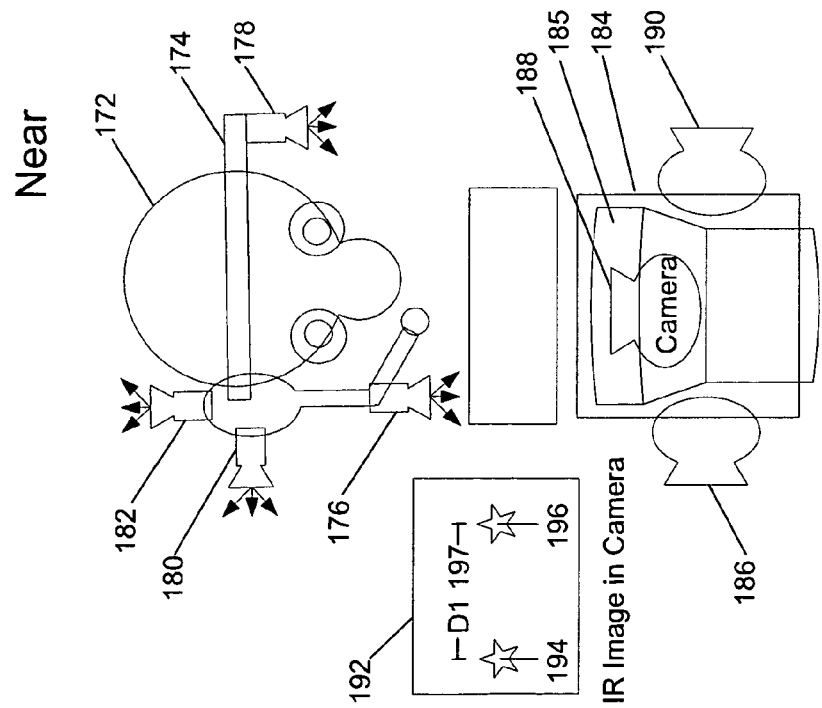

FIGS. 16A and 16B are diagrams illustrating example user presence states related to the user distance from a visual display 185 detected by the IR sensor system example shown in FIG. 15A where a user 172 is facing the display 185 such that IR light source 176 and IR light source 178 are detected as object images in an image capture by an IR light sensor 188, where the IR light sensor 188 is a 2-D IR camera. FIG. 16A shows a captured IR image 192 where an IR light source object image 194 and IR light source object image 196 are separated by a distance D1 197. FIG. 16B shows a captured IR image 198 where an IR light source object image 194 and IR light source object image 196 are separated by a distance D2 199. As shown in FIG. 16A, where the user 172 is in a presence state of "Near" in close proximity to the display 185, the distance D 1 197 is greater than the distance D2 199 which corresponds to the user 172 in a presence state of "Far" a further distance from the display 185.

Figure 17A:
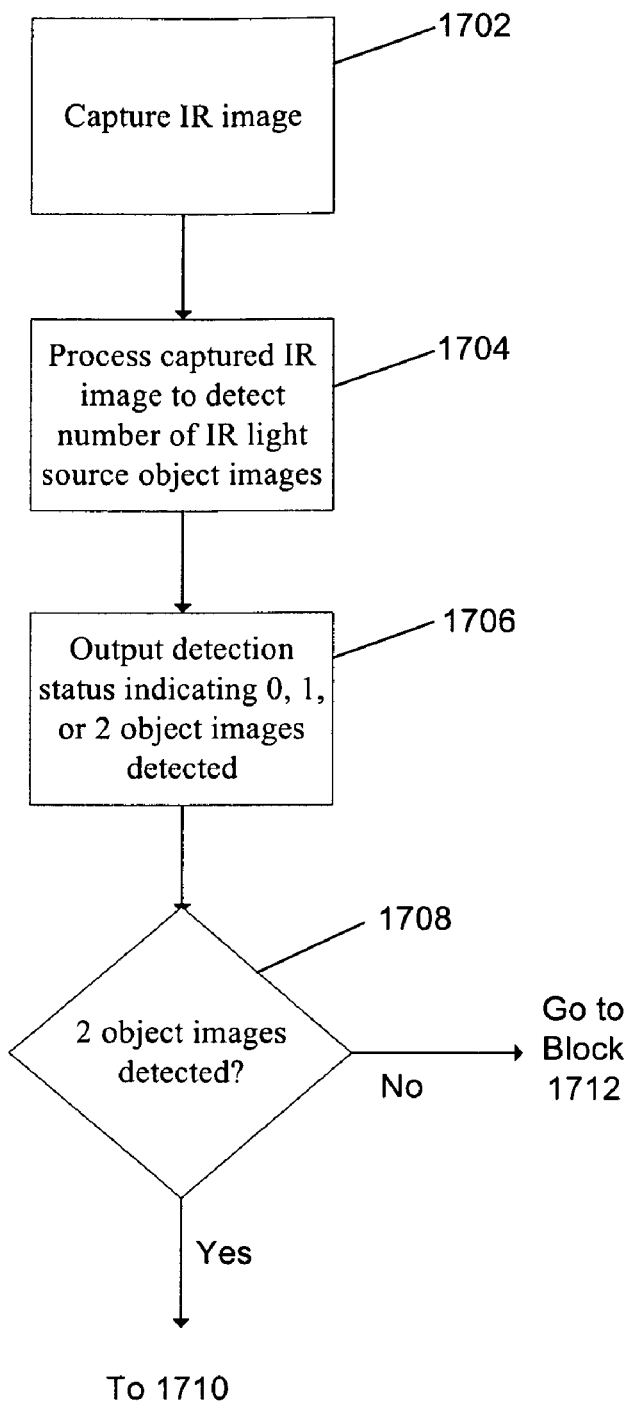
FIGS. 17A and 17B are a flow diagram illustrating reporting of user presence state data by the IR sensor system and method for user presence detection and display control.
Figure 17B:
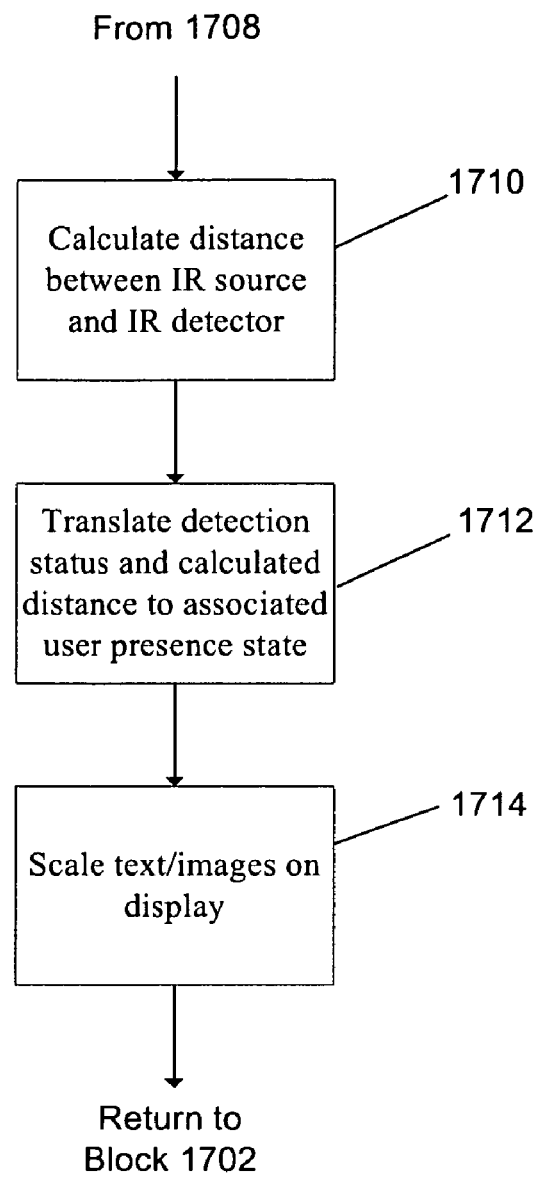

FIG. 17 is a flow diagram illustrating a method for reporting of user presence data and display control. At block 1702, an IR image is captured. At block 1704, the captured IR image is processed to detect the number of IR light source object images appearing within the image. At block 1706, a detection status is output indicating whether zero, one, or two IR light source object images have been detected. As described previously, data being transmitted by the IR light source objects may also be detected and the IR light source validated.

At decision block 1708, it is determined whether two object images have been detected. If no at decision block 1708, the process proceeds to block 1712. If yes at decision block 1708, at block 1710, the distance between an IR sensor and the IR light sources is calculated. Where the IR light sources are located at the display device and the head mounted device performs the image capture, this calculated distance corresponds to the distance between the head mounted device and the display device. In one example, the distance data is translated to an associated user presence state.

At block 1712, the detection status and calculated distance (if available) are translated to an associated user presence state. In one example, the associated user presence state includes one or more of the following: a near status, a far status, a facing a display device status, a not facing a display device status, or a calculated distance from a display device. At block 1714, the text or images displayed on a display are scaled in size responsive to the calculated distance (if available). Following block 1714, the process returns to block 1702. In a further example, the method further includes capturing a series of IR images and processing the image data to identify a transmitted unique code (like a physical address) and processing the data to identify a valid source. The method may also include outputting an audio signal or other alert responsive to a detection status that one of the two IR light source object images has been detected. The method may also include scaling a visual communication size output on a display device responsive to receiving a user input action at the head mounted device. Using a user interface control on the HMD (up/down button, slider, scroll wheel), the user can adjust the scaling dynamically by communicating the HMD control state over a wireless link such as Bluetooth. The user can also set the existing scaling factor as a new default. This solves the problem of varying font and eyesight on the automatic scaling. In a further example, the associated user presence state is transmitted to a presence server.

For example, in one use scenario a user is determined to have a "near" status to the display screen, but also a "not facing" the display status. He is alerted to face the display with an audio beep that an instant message is available. Once the user faces the display, the application detects the "facing" the display status and estimates his distance from the display. It is determined that he is at a distance of 10 feet and scaling is required, where there is a 2 foot threshold for scaling in this example. The instant message window contents, including text and graphics, are scaled by a factor of 5 to accommodate the distance. The user sees the same visual size as he would sitting at his computer and is able to read the IM comfortably. This solves the problem of the user standing too far away to read the IM. The numerical values used in this example are for illustrative purposes only, and one of ordinary skill in the art will recognize that different values can be substituted.

The determined associated user presence state may be used in a user authentication process or de-authentication process. For example, if the user presence state is "facing" the display, then an authentication process required for the user to operate the personal computer may be triggered. A variety of authentication processes may be utilized including, for example, password entry by the user or an automated face recognition program relying on the user facing the display. The user may be de-authenticated if the user presence state is "not facing" the display for pre-determined period of time.

In a further example, the determination of the user presence state using IR techniques described herein is used as an out-of-band channel security verification/confirmation that the user is present for security purposes. Often, security protocols such as authentication are implemented using data exchanged over a single communication channel. If this channel is compromised, the security can be compromised. In this example, two channels of communication are used: a primary "in-band" channel and a secondary "out-of-band" channel. Having secure exchanges over the out-of-band channel increases the difficulty of compromising a security system. In this example, the in-band channel is an RF channel and the out-of-band channel is the IR channel. In a further example, the in-band channel is a wired link.

For example, a Bluetooth device such as a headset described herein communicates to an application on a PC using a Bluetooth radio link. If this radio link is compromised or corrupted, a malicious person or software application can hijack the link and make it appear as if the user were present. By adding an IR out-of band link, and further integrating into the security system a check for IR presence, the possibility of remote hijacking is reduced. Any security attack would now require the headset to be physically present as verified by the determination of the user presence state. This out-of-band presence indication method can be further attack-strengthened by an application security software sending a random code (also called a nonce) over the main channel that must be sent back over the out-of-band channel to confirm physical presence.

In one example, collision avoidance techniques are used where two or more HMDs are present. Using IR detection to indicate orientation presence (FACE/NO FACE) works fine without data transmission as long as there is only one HMD. However, if there are two or more HMDs, each worn by a different user, there is a need to distinguish one unit from the other. Otherwise, the presence may be a false indication for a specific user. Sending unique data for each user/unit provides an effective solution. However, a new problem arises in that the receiver may receive both pieces of unique data at the same time. This can lead to problems decoding the data in the IR receiver.

One collision avoidance technique used to address this problem is channelization. Channelization commonly occurs in frequency domain multiplexing (FDM), time domain multiplexing (TDM) and through code division multiplexing (CDMA). FDM requires the ability to transmit and receive on several frequencies at once which is possible, but makes for more complicated IR receiver since they are generally narrowband for lower cost. CDMA, while also possible, again complicates the transmission and receiver units. TDM can be done simply by choosing time slots when it is acceptable to transmit. In this case, the hardware can stay simple, and only the application software and firmware need to be complicated to achieve channelization.

If all IR transmitters and receivers are synchronized to the same clock, then each user can be assigned a unique slot to transmit on. For example, a 1.28 second period can be divided into 128 10 ms slots. The last 7 bits of the unique address of the radio device can determine the slot to be used. The probability of two HMDs transmitting at the same time approaches less than 1 percent assuming the addresses of any two units are random. However, the problem arises that if there is a conflicting address, say by two employees who regularly work together, they will continue to conflict (not random). Further reduction in collision can occur by adding a random component to slot assignment each time an IR transmission occurs instead of basing it on address. For example, a HMD could transmit in slot n mod 128 slots where n is a random integer generated each time the IR link is used by an HMD. This increases the randomness of the slot selection as no two headsets with the same address will generate the same random number.

For those systems without synchronization, these techniques still reduce collisions. In this case, two HMDs would use their own clocks to determine slots. However, because the slots are not synchronized, two HMD's could still collide with part or all of the other's transmission, even if their slots are different. Use of a new random integer each time a transmission occurs ensures that if there is a collision, there will most likely not be one on the next transmission.

Figure 18:
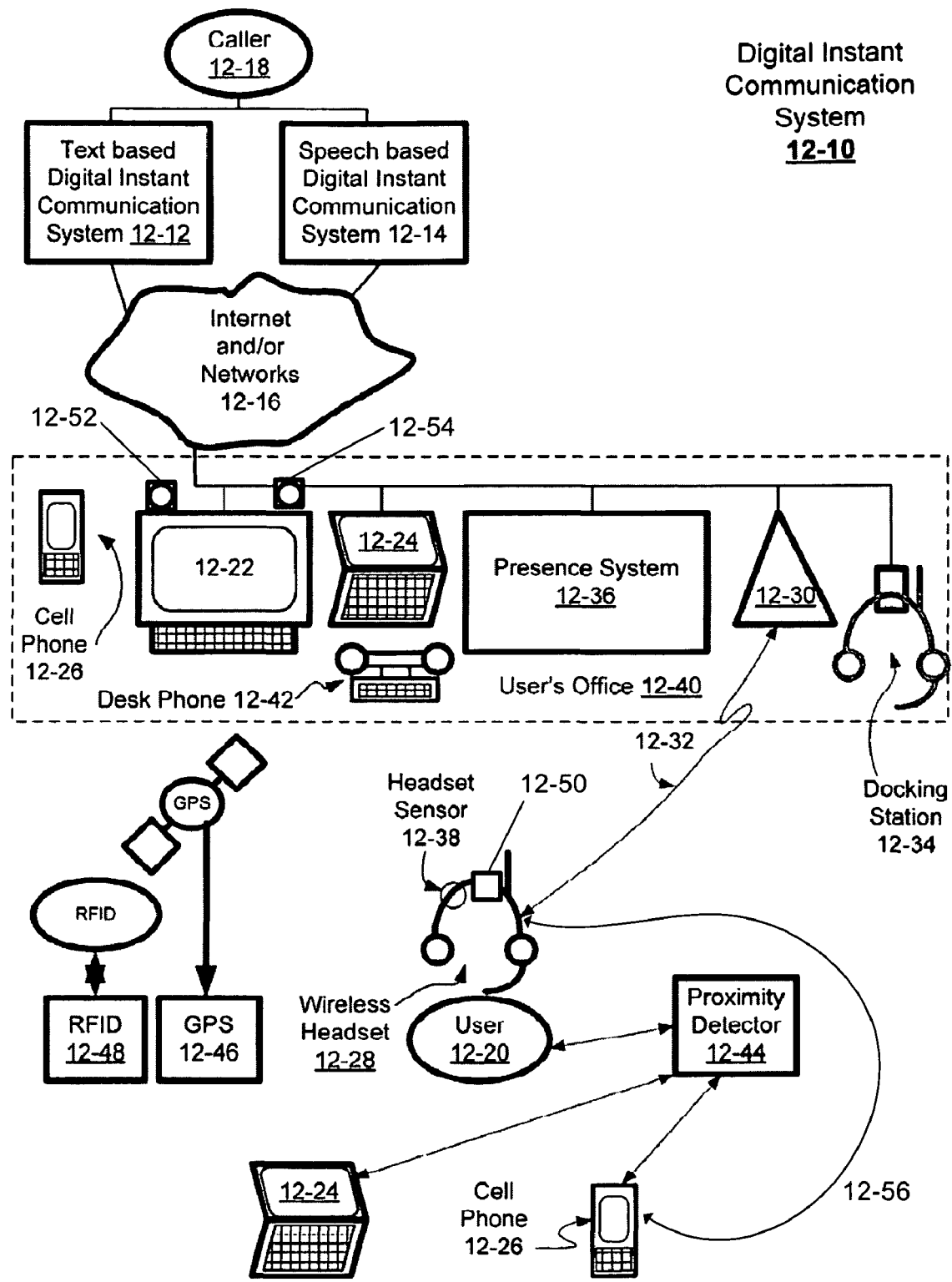
FIG. 18 illustrates an example use of the IR sensor system and method for user presence detection and display control in a digital instant communication system.

FIG. 18 illustrates an example use of the system and method for reporting IR derived presence information in a digital instant communication system, including proximity and user viewing direction information. A digital messaging system 12-10 may process text based digital instant communications, to or from caller 12-18, such as instant messages (IMs), which may be sent via system 12-12 and speech based digital instant communications, such as VoIP calls and messages, which may be sent via system 12-14. Communications on systems 12-12 and 12-14 may be sent via the Internet or other networks 12-16 to user 12-20 via various computer and communications systems such as desk top computer 12-22, laptop computer 12-24, and/or wireless headset 12-28. VoIP calls may be directed to desk phone 12-42. Headset 12-28 may be wirelessly connected to networks 12-16, and/or via an intermediary device associated with user 12-20 such as computers 12-22 or 12-24 via wireless headset base station 12-30 which communicates with headset 12-28 via wireless link 12-32. Wireless headset 12-28 may also be connected to networks 12-16 via cell phone 12-26 through another wireless link 12-56. Headset docking and/or charging station 12-34 may be used for storing headset 12-28 and/or charging the batteries in wireless headset 12-28.

User 12-20's computers 12-22 and/or 12-24 have systems, such as software programs, which respond to and interact with systems 12-12 and 12-14. Presence system 12-36 interacts with digital instant messages from caller 12-18 and monitors one or more conditions related to wireless headset 12-28, for example by monitoring headset sensor 12-38 or other devices such as RFID system 12-48, GPS 12-46, proximity detector 12-44 and/or base station or docking station 12-34 or other devices as convenient. Information or data from headset sensor 12-38 may be provided via wireless link 12-32 to presence system 12-36 via a computer such as 12-22 in which presence system 12-36 may be implemented as an application. Presence system 12-36 may also run on a server, not shown.

In one example, the systems and methods of head mounted device 4 described above in all of its embodiments are incorporated into the wireless headset 12-28. Similarly, in this example, the systems and methods of personal computer with display 6 are incorporated into computers 12-22 or 12-24, and the systems and methods of base unit 2 are incorporated into wireless headset base station 12-30. Thus, in one example base station 12-30 includes an IR light source 12-52 and an IR light source 12-54 in the vicinity of a display of computers 12-22 or 12-24. Wireless headset 12-28 includes a 2-D IR camera 12-50 in addition to or in alternative to headset sensor 12-38. Wireless headset 12-28 reports presence information related to whether user 12-20 is viewing the display and the user proximity to the display using the IR derived methods and systems as described above. Wireless headset 12-28 reports the presence information over wireless link 12-32 to wireless headset base station 12-30, which then relays the presence information to Presence System 12-36.

As described below in greater detail, presence system 12-36 may estimate, from a monitored condition, a potential for user 12-20 to receive and immediately respond to a digital instant communication from caller 12-18 which may be directed to anyone of several devices accessible to user 12-20 for example in his normal workspace such as user's office 12-40, including computer's 12-22, 12-24, cell phone 12-26 and desk phone 12-42. Some of these devices such as notebook computer 12-22 and/or cell phone 12-26 may also be accessible to user 12-20 outside of user's office 12-40.

The monitored condition may be whether the user is facing or not facing the display of computers 12-22 or 12-24 and whether the user is near or far from the display. The monitored condition may be related to the proximity between wireless headset 12-28 and the computers 12-22 or 12-24, where the proximity is derived using IR systems and methods as described herein. The monitored condition may be useful in determining the estimated potential described below. For example, presence system 12-36 may estimate from the monitored condition associated a potential for user 12-20 to view and immediately respond to a digital instant message, either from caller 12-18 or other far-end user, transmitted by text or speech based digital instant communication systems 12-12 and 12-14 and displayed as text or video on the display of computers 12-22 or 12-24. Furthermore, the size of the text, graphic, or video appearing on the display may be scaled based on the monitored condition.

The monitored condition may indicate a current condition or a recent action of user 12-20 which may have been to don the headset by putting it on, doff the headset by taking it off, dock the headset by applying it to docking or charging station 12-34, move while wearing the headset, e.g. out of office 12-40 and/or carry the headset. The difference between a current condition or a recent action may be useful in determining the estimated potential described below. The monitored condition may indicate a likely current relationship, such as proximity, between user 12-20 and headset 12-28, which may be detected by headset sensor 12-38 which may detect a characteristic of user 12-20 such as body temperature.

The monitored condition may also be related to proximity between the headset and a communicating device associated with user 12-20 at that time for receiving and transmitting digital instant communications, such as notebook computer 12-24 and/or cell phone 12-26 which may be with or near user 12-20 for example, when out of the office 12-40. Proximity may be detected by headset sensor 12-38 or by comparison of various location based systems as discussed in more detail below or any other proximity detection scheme illustrated by proximity detector 12-44 which may for example monitor communications between wireless headset 12-28 and cell phone 12-26 to detect proximity there between. Further details regarding detecting proximity can be found in the commonly assigned and co-pending U.S. patent application entitled "Headset-Derived Real-Time Presence and Communication Systems and Methods", application Ser. No. 11/697, 087, which was filed on Apr. 5, 2007, and which is hereby incorporated into this disclosure by reference for all purposes.

The monitored condition may be related to proximity of the headset to one or more locations. For example, headset sensor may include a GPS receiver or other location based information system, such as GPS system 12-46, may be used to determine that user 12-20 is in or near a specific location such as a hallway, office, conference room or bathroom. Other systems which use the strength, timing or coding of received signals transmitted between headset 12-28 and known locations can also be used. Similarly, RFID system 12-48 in which an interrogatable tag is located at a known location or on headset 12-28 may also be used.

Presence system 12-36 may estimate from the monitored condition a potential for user 12-20 to receive and immediately respond to a digital instant message from caller 12-18 transmitted by text or speech based digital instant communication systems 12-12 and 12-14. These estimates may be based on rule based information applied to the monitored condition, e.g. various levels for the potential for user 12-20 may be determined by rules applied to one or monitored headset conditions. That is, the potential may be different for the same location depending on whether the user has donned, doffed or docked the headset or is moving while wearing or carrying the phone and or whether the user had done so recently. As one example, user 12-20 may have a low potential for receiving and immediately responding to a digital instant message even if carrying headset 12-28 while in a supervisor's office or even when headset 12-28 is donned while in an elevator, while having a high potential while proximate docking station 12-34 even when headset 12-28 is docked.

The potential may include an estimate of the user's presence, availability and/or willingness to receive and immediately respond to a digital instant message from caller 12-18 based on the identification of the caller or an estimate that the user may (or may not be) willing to do so while in his supervisor's office or in a boardroom. The estimate may be made in response to receipt of a text or speech based digital instant communication by cell phone 12-26, desktop computer 12-22, notebook computer 12-24, desk phone 12-42 or any other equipment associated with the user such as an office computer server or similar equipment. The estimate may also be made before the communication is received, for example, on a continuous or periodic basis.

In operation, for example if user 12-20 is out of office 12-40 but proximate cell phone 12-26 or notebook computer 12-24, an incoming digital instant communication received from networks 12-16 may be automatically directed to user 12-20 via wireless headset 12-28 if the estimated potential for user 12-20 to receive and immediately respond to the incoming communication indicates that the user is likely to immediately respond to the communication.

As one specific example, caller 12-18 may send an instant message (IM) to user 12-28 received by desktop computer 12-22 asking "R U THERE" which may be automatically directed to wireless headset 12-28 in accordance with the estimated potential even if the user is out of office 12-40 and without cell phone 12-26 or notebook computer 12-24. Presence system 12-36, or another appropriate system, may provide an audible message to the user from text associated with the incoming digital instant communication, for example, by converting the text based message to an audible speech message "Are you there?" which may be provided to user 12-20 via wireless headset 12-28 if the estimated potential is that user 12-28 is likely to immediately respond.

User 12-20 may respond by speaking a command phrase such as "Not now" which may be provided as an outgoing message, such as a reply IM to caller 12-18 which may be "Not now but I'll call you as soon as I'm available". Similarly, user 12-20 may speak the command "3 pm" which may then be included in the reply IM as "Call me back at 3 p.m."

Alternately, if when the "R U THERE" IM is received by communications equipment associated with user 12-20 when the estimated potential is that user 12-28 is likely to immediately respond but the headset condition indicates that user 12-20 is not currently wearing the headset 12-28 while remaining proximate to headset 12-28, a signal may be provided to the headset, such as a tone or prerecorded message or flashing light or other signal indicating current receipt of an incoming digital instant message. The signal may be perceptible to user 12-28 even if user 12-28 is not wearing headset 12-28. The estimated potential may include the information that user 12-20 is not wearing headset 12-28 but is proximate thereto.

If user 12-20 decides to respond to the incoming digital instant communication by immediately engaging caller 12-18 in a conversation, user 12-20 may respond to the "R U THERE" IM by speaking or otherwise issuing a command such as "Pick Up" which causes a bidirectional voice communication channel, such as a VoIP channel or a standard telephone call via desk phone 12-42 to be opened between caller 12-18 and user 12-20 via wireless headset 12-28.

Alternatively, if when the "R U THERE" IM is received by communications equipment associated with user 12-20 when the estimated potential is that the user 12-28 is likely to respond because the user is viewing the display of computers 12-22 or 12-24, the IM is output on the display of computers 12-22 or 12-24.

Figure 22:
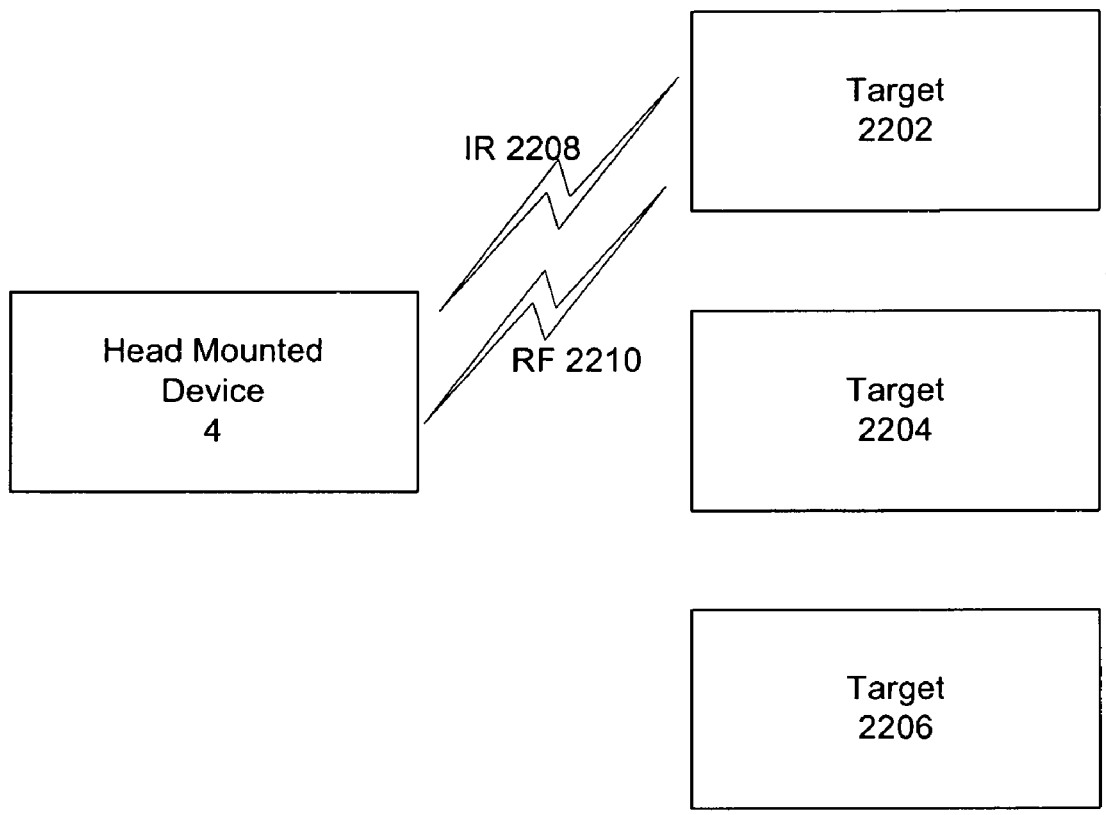
FIG. 22 illustrates a head mounted device used as a controller in a point and select system.

FIG. 22 illustrates a head mounted device 4 used as a controller in a point and select system 2200. In system 2200, a head mounted device 4 is used as a pointer to select between target 2202, target 2204, and target 2206 using an IR link 2208. The number of target receivers to select from may be varied dependent upon the particular implementation. IR link 2208 is uni-directional from head mounted device 4 to the target devices in on example to reduce component costs. Head mounted device 4 is also used to control the selected target receiver using function commands.

In one example, head mounted device 4 is substantially as shown in FIG. 5, having at least one IR source. The IR beam output from head mounted device 4 is designed to be narrow to assist in selecting the desired target device from the several target devices. The head mounted device 4 may also include an accelerometer. Each target 2202, 2204, and 2206 includes an IR receiver such as an IR camera or an IR photodetector. In further examples, the head mounted device 4 may have an IR receiver instead of or in addition to the IR source, and each target device may have an IR source instead of or in addition to the IR receiver.

The target devices 2202, 2204, and 2206 and HMD 4 can be always transmitting and/or receiving as the particular application desires. The HMD 4 can be placed in an active pointing mode by a user interface action such as a button press or a gesture recognized by an accelerometer. In one embodiment, sensing removal of the HMD 4 from the user's head places the HMD 4 in pointing mode as a controller.

For the embodiment in FIG. 5, to point at a target device, the HMD 4 IR source is directed at the target device. When a target device receiver detects the IR light, either the HMD 4 or target device emit an alert. For example, the alert may consist of a lit LED, an update of a display, an audible sound, or a vibration. In one embodiment, the IR source is sending data code that indicates the identity of the source. In another, it may send data code indicating desired function, and/or a target address. As an example how the code gets sent, the code can be simply ON/OFF keyed light in the case of 2-d camera receiver, or 38 KHz modulated ON/OFF keyed light in the case of a photodetector receiver.

In one example, a confirmation signal indicating the target has detected the IR signal and/or can execute the coded function and/or is the coded target is sent back from the selected target device to the HMD 4 using a wireless RF link 2210 as shown in FIG. 22. This is possible since the HMD 4 can transmit its identity and other sufficient data to allow the target device to connect wirelessly with it. For example, for a Bluetooth capable HMD 4 target pair, if previously paired, a connection can be made and the confirmation sent. If previously unpaired, Bluetooth pairing is required between the HMD 4 and a target device before communication can occur and then the connection made and confirmation sent. In either case, when the HMD 4 receives the confirmation signal, it emits an alert. In some applications, where the IR receiver is on the HMD 4, it is sufficient for the HMD 4 to send the alert when it has detected a target device.

Given that an alert has occurred, the user can select the target device if desired. This is done either with a confirming button or control press or by shaking the HMD 4 in a prescribed gesture if the HMD is equipped with an accelerometer. For example, the required gesture may be an up and down motion or any rapid motion. If the selected target device is incorrect, the user may reject the target device with a different gesture or control.

If multiple target devices have indicated that they are pointed to (for example they all receive the IR signal and are capable of the coded function if present), the user can select or reject targets from a displayed or audio list on the HMD if that is the alert method. Alternatively the user can approach one or more targets, reducing the IR illuminated area to one or more targets and use a gesture or control to select or reject them. Alternatively, the user can communicate a command to all targeted devices using the HMD 4 that they are to turn their alerts off, then on at random times. The user then rejects or ignores devices as their alerts appear until the desired target device alerts whereupon it is selected.

In one example, a method for operating a head mounted device as a controller includes providing a head mounted device with an IR light source and an RF transceiver. The method includes transmitting from the head mounted device a desired function to a target device using the IR light source. Data is received at the head mounted device RF transceiver from the target device responsive to transmitting from the head mounted device a desired function using the IR light source. In one example, the HMD 4 sends both its desired function and identifier (such as an address) to a target device. The target device may be any device with both a Bluetooth radio and IR receiver. If the HMD 4 requested function is Bluetooth pairing, the target device chooses to pair by activating its Bluetooth pairing protocol. Any number of functions may be requested using the one-way IR link between the HMD 4 and target device, and the wireless Bluetooth link may be used to transfer data in response to the request. For example, the HMD 4 requested function may be for a target display device to "display headset configuration panel", and the target display device then receives display data over the responsively formed Bluetooth link and displays it. If previously unpaired, the target display device and HMD 4 first pair as part of an agreed upon protocol for pointing, and once paired, the target device displays the data received over the Bluetooth link.

In a further example, the IR light source(s) is located at the target device(s) and the IR receiver is located at the HMD 4. In this example, the Bluetooth address of the target device is beaconed over the IR link from the target device to the HMD 4. Upon facing the target device, the HMD 4 requests pairing if not previously paired, and then proceeds to make function requests over the Bluetooth link.

Figure 19:
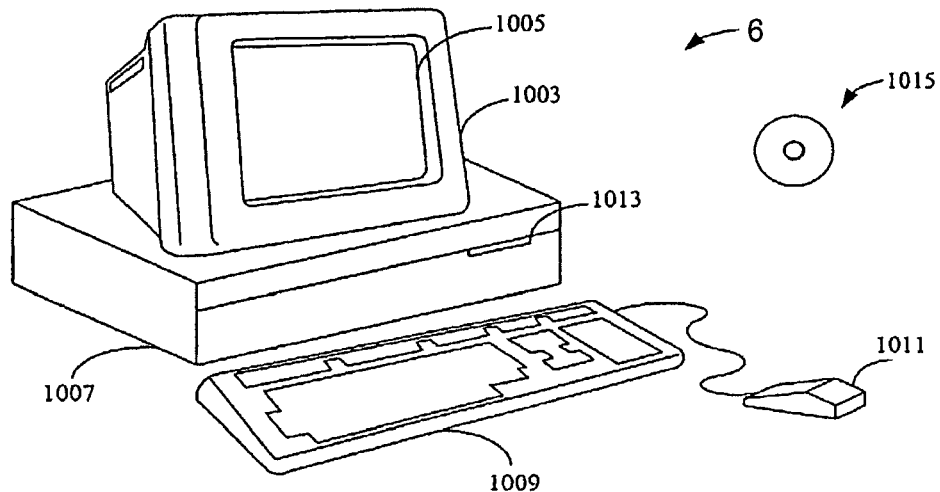
FIG. 19 is a diagram illustrating the external appearance of the personal computer with visual display shown in FIG. 2.
Figure 20:
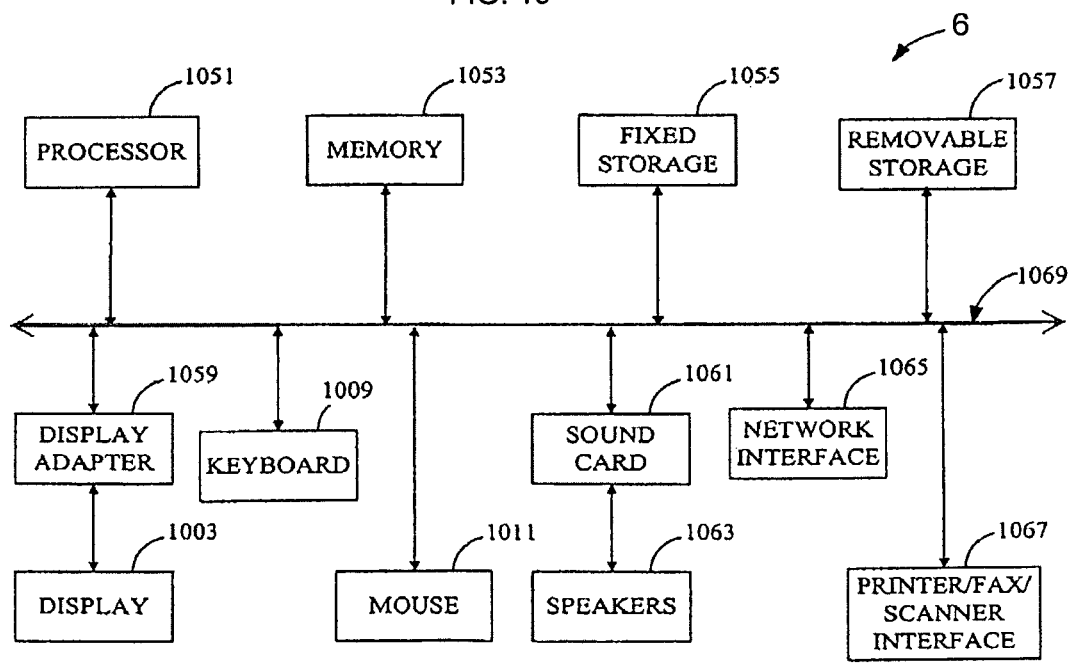
FIG. 20 is a simplified block diagram of the personal computer with visual display shown in FIG. 2.

FIGS. 19 and 20 illustrate a schematic and a block diagram, respectively, of an exemplary general purpose personal computer with display 6 suitable for executing software programs that implement the methods and processes described herein. The architecture and configuration of the personal computer with display 6 shown and described herein are merely illustrative and other computer system architectures and configurations may also be utilized.

The exemplary personal computer with display 6 includes a display 1003, a screen 1005, a cabinet 1007, a keyboard 1009, and a mouse 1011. The cabinet 1007 typically houses one or more drives to read a computer readable storage medium 1015, a system memory 1053, and a hard drive 1055 which can be utilized to store and/or retrieve software programs incorporating computer codes that implement the methods and processes described herein and/or data for use with the software programs, for example. A CD is shown as an exemplary computer readable storage medium 1015 readable by a corresponding CD-ROM or CD-RW drive 1013. Computer readable medium typically refers to any data storage device that can store data readable by a computer system. Examples of computer readable storage media include magnetic media such as hard disks, floppy disks, and magnetic tape, optical media such as CD-ROM disks, magneto-optical media such as floptical disks, and specially configured hardware devices such as application-specific integrated circuits (ASICs), programmable logic devices (PLDs), and ROM and RAM devices.

Further, computer readable storage medium may also encompass data signals embodied in a carrier wave such as the data signals embodied in a carrier wave carried in a network. Such a network may be an intranet within a corporate or other environment, the Internet, or any network of a plurality of coupled computers such that the computer readable code may be stored and executed in a distributed fashion.

The personal computer with display 6 comprises various subsystems such as a microprocessor 1051 (also referred to as a CPU or central processing unit), system memory 1053, fixed storage 1055 (such as a hard drive), removable storage 1057 (such as a CD-ROM drive), display adapter 1059, sound card 1061, transducers 1063 (such as speakers and microphones), network interface 1065, and/or printer/fax/scanner interface 1067. The personal computer with display 6 also includes a system bus 1069. However, the specific buses shown are merely illustrative of any interconnection scheme serving to link the various subsystems. For example, a local bus can be utilized to connect the central processor to the system memory and display adapter.

Methods and processes described herein may be executed solely upon CPU 1051 and/or may be performed across a network such as the Internet, intranet networks, or LANs (local area networks) in conjunction with a remote CPU that shares a portion of the processing.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A system for determining a user capacity to view a visual communication on a display device comprising:
   a display device;
   an infrared image capturing device;
   a first infrared light source capable of being captured by the infrared image capturing device;
   a second infrared light source capable of being captured by the infrared image capturing device, wherein the first infrared light source and the second infrared light source are disposed in proximity to the display device and the infrared image capturing device is disposed at a head mounted device; and
   a processor configured to analyze a position of a first infrared light source object image relative to a second infrared light source object image to identify a user status comprising a user capacity to view a visual communication on the display device.

2. The system of claim 1, wherein the processor is further configured to determine whether neither the first infrared light source object image or second infrared light source object image is present, both the first infrared light source object image and the second infrared light source object image are present, or either the first infrared light source object image or the second infrared light source object image is present.

3. The system of claim 1, wherein the user status comprises one or more selected from the following: a near status, a far status, a facing the display device status, a not facing the display device status, or a calculated distance from the display device.

4. The system of claim 1, further comprising a display device controlling means for scaling a visual communication size output on the display device responsive to the user status.

5. The system of claim 1, wherein the first infrared light source and the second infrared light source are infrared light emitting diodes and the infrared image capturing device is an infrared light detector.

6. A system for determining a user capacity to view a visual communication on a display device comprising:
   a display device;
   an infrared image capturing device;
   a first infrared light source capable of being captured by the infrared image capturing device;
   a second infrared light source capable of being captured by the infrared image capturing device;
   a third infrared light source and a fourth infrared light source, wherein the first infrared light source, the second infrared light source, the third infrared light source, and the fourth infrared light source are disposed at a head mounted device such that the first infrared light source and the second infrared light source emit infrared light in a first direction, the third infrared light source emits infrared light in a second direction opposite the first direction, and the fourth infrared light source emits infrared light in a third direction perpendicular to the first direction; and
   a processor configured to analyze a position of a first infrared light source object image relative to a second infrared light source object image to identify a user status comprising a user capacity to view a visual communication on the display device.

7. A method for determining a user capacity to view a visual communication comprising:
   capturing an image data with an infrared image capturing device disposed at a head mounted device;
   processing the image data to determine a presence of both a first infrared light source image associated with a first infrared light source and a second infrared light source image associated with a second infrared light source, the first infrared light source and the second infrared light source disposed in proximity to a display device; and
   analyzing a position of the first infrared light source image relative to the second infrared light source image to identify an associated user presence state.

8. The method of claim 7, wherein the associated user presence state comprises one or more selected from the following: a near status, a far status, a facing a display device status, a not facing a display device status, or a calculated distance from a display device.

9. The method of claim 7, further comprising calculating distance data associated with a distance between the head mounted device and a display device, and further comprising translating the distance data to an associated user presence state.

10. The method of claim 9, further comprising scaling a visual communication size output on the display device responsive to the distance between the head mounted device and the display device.

11. The method of claim 7, further comprising:
    processing the image data to identify a transmitted unique identifier; and
    processing the transmitted unique identifier to identify a valid source.

12. The method of claim 7, further comprising transmitting the associated user presence state to a presence server.

13. The method of claim 7, further comprising scaling a visual communication size output on a display device responsive to receiving a user input action at the head mounted device.

14. The method of claim 7, further comprising initiating a user authentication process responsive to the associated user presence state.

15. A non-transitory computer readable storage medium storing instructions that when executed by a computer cause the computer to perform a method for determining a user capacity to view a visual communication comprising:
    receiving image data with an infrared image capturing device disposed at a head mounted device;
    processing the image data to determine a presence of a first infrared light source image associated with a first infrared light source and a second infrared light source image associated with a second infrared light source, the first infrared light source and the second infrared light source disposed in proximity to a display device; and
    analyzing a position of the first infrared light source image relative to the second infrared light source image to identify an associated user presence state.

16. The non-transitory computer readable storage medium of claim 15, wherein the associated user presence state comprises one or more selected from the following: a near status, a far status, a facing a display device status, a not facing a display device status, or a calculated distance from a display device.

17. The non-transitory computer readable storage medium of claim 15, wherein the method further comprises:
    calculating distance data associated with a distance between the head mounted device and a display device; and translating the distance data to an associated user presence state.

18. The non-transitory computer readable storage medium of claim 17, wherein the method further comprises scaling a visual communication size output on the display device responsive to the distance between the head mounted device and the display device.

19. The non-transitory computer readable storage medium of claim 15, wherein the method further comprises:
processing the image data to identify a transmitted unique identifier; and
processing the transmitted unique identifier to identify a valid source.

20. A system for determining a user capacity to view a visual communication on a display device comprising:
a display device;
an infrared image capturing device;
a first infrared light source capable of being captured by the infrared image capturing device;
a second infrared light source capable of being captured by the infrared image capturing device;
a third infrared light source and a fourth infrared light source, wherein the first infrared light source, the second infrared light source, the third infrared light source, and the fourth infrared light source are disposed at a head mounted device such that the first infrared light source and the second infrared light source emit infrared light in a first direction, the third infrared light source emits infrared light in a second direction opposite the first direction, and the fourth infrared light source emits infrared light in a third direction perpendicular to the first direction;
an image processing means for determining a presence of a first infrared light source object image and a second infrared light source object image in a captured image output from the infrared image capturing device; and
a user status determination means for translating an image processing means output to a user status indicating a user capacity to view a visual communication on the display device.

21. The system of claim 20, wherein the image processing means output is a determination that neither the first infrared light source object image or second infrared light source object image is present, both the first infrared light source object image and the second infrared light source object image are present, or either the first infrared light source object image or the second infrared light source object image is present.

22. The system of claim 20, wherein the user status comprises one or more selected from the following: a near status, a far status, a facing the display device status, a not facing the display device status, or a calculated distance from the display device.

23. The system of claim 20, further comprising a display device controlling means for scaling a visual communication size output on the display device responsive to the user status.

24. A non-transitory computer readable storage medium storing instructions that when executed by a computer cause the computer to perform a method for determining a user capacity to view a visual communication comprising:
receiving an image data associated with a head mounted device;
outputting a detection status responsive to processing the image data to determine a presence of a first infrared light source image, a second infrared light source image, a third infrared light source image, or a fourth infrared light source image, wherein a first infrared light source, a second infrared light source, a third infrared light source, and a fourth infrared light source are arranged such that the first infrared light source and the second infrared light source emit infrared light in a first direction, the third infrared light source emits infrared light in a second direction opposite the first direction, and the fourth infrared light source emits infrared light in a third direction perpendicular to the first direction; and
translating the detection status to an associated user presence state.

25. The non-transitory computer readable storage medium of claim 24, wherein the associated user presence state comprises one or more selected from the following: a near status, a far status, a facing a display device status, a not facing a display device status, or a calculated distance from a display device.

26. The non-transitory computer readable storage medium of claim 24, wherein the method further comprises:
calculating a distance data associated with a distance between the head mounted device and a display device; and
translating the distance data to an associated user presence state.

27. The non-transitory computer readable storage medium of claim 26, wherein the method further comprises scaling a visual communication size output on the display device responsive to the distance between the head mounted device and the display device.

28. The non-transitory computer readable storage medium of claim 24, wherein the method further comprises:
processing the image data to identify a transmitted unique identifier; and
processing the transmitted unique identifier to identify a valid source.

* * * * *